(12) United States Patent
Sakurai et al.

(10) Patent No.: US 7,092,164 B2
(45) Date of Patent: Aug. 15, 2006

(54) LENS ARRAY AND IMAGE DISPLAY APPARATUS OF PROJECTION TYPE

(75) Inventors: Kenji Sakurai, Kyotanabe (JP); Daido Uchida, Hirakata (JP); Shigeru Aoyama, Kyoto (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 10/927,791

(22) Filed: Aug. 27, 2004

(65) Prior Publication Data
US 2005/0063068 A1    Mar. 24, 2005

(30) Foreign Application Priority Data
Aug. 28, 2003    (JP)    ............ 2003-209441

(51) Int. Cl.
G02B 27/10    (2006.01)
G03B 21/60    (2006.01)
G02F 1/1335    (2006.01)

(52) U.S. Cl. ............ 359/626; 359/455; 359/619; 359/628; 349/95

(58) Field of Classification Search ........ 359/454–456, 359/619, 624, 626, 628; 349/95
See application file for complete search history.

(56) References Cited

U.S. PATENT DOCUMENTS 6,724,544 B1 *    4/2004    Kishima et al. ............ 359/719

* cited by examiner

Primary Examiner—Loha Ben
Assistant Examiner—Jack Dinh
(74) Attorney, Agent, or Firm—Osha Liang LLP

(57) ABSTRACT

A lens array capable of effectively converging light entering from a light source and constituting a liquid crystal device of a high contrast includes liquid crystal of a twisted nematic type sandwiched between a TFT substrate and a counter substrate. A micro lens array is formed in the counter substrate. Lenses constituting the micro lens array respectively have a shape of a rotational aspheric surface, and an optical center axis F thereof is tilted in a bright vision direction of the liquid crystal.

6 Claims, 32 Drawing Sheets

PRIOR ART

PRIOR ART

PRIOR ART

PRIOR ART

PRIOR ART

PRIOR ART

PRIOR ART

Reverse bright vision direction

Bright vision direction

Reverse bright vision direction

Bright vision direction

Reverse bright vision direction

Bright vision direction

Fig. 28

|  | Conventional case (no MLA) | Conventional case (with MLA) | Present invention (deflected MLA) |
|---|---|---|---|
| Brightness | 1.0 | 1.7 | 1.6 |
| Contrast | 1.0 | 0.8 | 0.9 |

LENS ARRAY AND IMAGE DISPLAY APPARATUS OF PROJECTION TYPE

BACKGROUND OF THE INVENTION

1. Field of the Invention

The present invention relates to a lens array and an image display apparatus of a projection type, in particular, to a lens array suitably used in a liquid crystal device, in which liquid crystal sealed between a pair of substrates exhibits a twisted orientation between the substrates, and an image display apparatus of a projection type using the lens array.

2. Description of the Related Art

In the projection type image display apparatus, for example, lights comprised of primary colors of red, blue and green are penetrated through respective liquid crystal devices (light valve) and an image component for each of the colors is formed, so that the image components are synthesized to thereby create a desired color image and project the image on a screen, or the like.

FIG. 1 shows a partial schematic illustration of a configuration in cross section of a liquid crystal device 1 of a TN (twisted nematic) mode used as a light valve of an image display apparatus of a projection type. The liquid crystal device 1 is mainly comprised of a TFT substrate 2, a counter substrate 3, liquid crystal 4 and a spacer (not shown). In the TFT substrate 2, pixel electrodes 6 are arrayed in an inner surface of a glass substrate 5 in a matrix shape, a black matrix region 7 is provided in a region surrounding the pixel electrodes 6, and an alignment film 8 made of a polyimide film, or the like, is provided on the pixel electrodes 6 and the black matrix region 7. The pixel electrodes 6 are formed in a window shape by means of a transparent electrode film. The black matrix region 7 is a region where TFTs (thin-film transistor) for turning on/off the respective pixel electrodes 6, wirings such as data lines and scan lines, and the like are provided. The surface of the black matrix region 7 is covered with a black mask made of a metal material such as chrome, resin black, or the like. In the counter substrate 3, transparent counter electrodes 10, such as ITO, and an alignment film 11 made of the polyimide film, or the like, are provided for an entire inner surface of a glass substrate 9. The counter substrate 3 is also provided with a light blocking film 12 formed in a lattice shape in such manner as opposed to the black matrix region 7 of the TFT substrate 2. The light blocking film 12 is a black mask made of a metal material such as chrome, the resin black, or the like.

The TFT substrate 2 and the counter substrate 3 are disposed in such manner as opposed to each other via the spacer. The liquid crystal 4 is sealed into between the alignment film 8 of the TFT substrate 2 and the alignment film 11 of the substrate 3 and held in a sandwiched state therebetween. As the liquid crystal 4 to be sealed thereinto, liquid crystal of the TN mode, which are twist-oriented through 90 degrees between the TFT substrate 2 and the counter substrate 3 by the alignment films 8 and 11, is widely used. In the liquid crystal device 1 configured in the foregoing manner, the respective TFTs are turned on/off by means of an image signal so that the orientation state of the liquid crystal 4 can be controlled between the pixel electrodes 6 and the counter electrodes 10. Therefore, in the liquid crystal device 1 of a transmission type, light entering the liquid crystal device 1 from the counter-substrate-3 side is first converted into a linearly polarized light having a predetermined direction by means of a light-entering-side polarizing plate (not shown), and then enters the liquid crystal 4 from the counter-substrate-3 side. A linearly polarized light transmitting through a region is twisted in polarizing axis and emitted from the TFT-substrate-2 side, while a linearly polarized light transmitting through a different region is not twisted in polarizing axis and emitted from the TFT-substrate-2 side. As a result, one of the linearly polarized light twisted in polarizing axis by the liquid crystal 4 and the linearly polarized light not twisted in polarizing axis by the liquid crystal 4 transmits through a light-emitting-side polarizing plate (not shown). Therefore, the control of the polarizing states per pixel enables predetermined information to be displayed.

FIG. 2 schematically shows an orientation state of the liquid crystal 4 sealed into between the alignment film 8 of the TFT substrate 2 and the alignment film 11 of the counter substrate 3. FIG. 2 is a perspective view from the light-emitting side, in which liquid crystal molecules are in a twist-oriented state by 90 degrees between the TFT substrate 2 and the counter substrate 3. As a method of twisting the liquid crystal 4 by 90 degrees, polyimide films, or the like, constituting the alignment films 8 and 11 are formed on inner surfaces of the respective substrates 2 and 3, and then, a rubbing treatment is performed between the respective alignment films 8 and 11 in directions making 90 degrees with respect to each other, as in respective rubbing directions shown in arrows A1 and A2. Next, the TFT substrate 2 and the counter substrate 3 are attached to each other, between which the liquid crystal 4 is sealed into. As a result, the liquid crystal 4 is oriented with a major axis thereof directed to the rubbing directions with respect to the alignment films 8 and 11, and the major axis direction of the liquid crystal 4 is rotated through 90 degrees to be thereby twisted between a pair of alignment films 8 and 11.

In the liquid crystal device 1, in which the liquid crystal 4 is twist-oriented in the foregoing manner, a phase difference of the liquid crystal is different depending on viewing angles. Therefore, as described below, a contrast characteristic exhibits anisotropy (direction of anisotropy is different if the liquid crystal 4 is twisted to right or twisted to left) in response to the orientation state of the liquid crystal 4 (major axis direction and tilt of major axis) disposed between the substrates 2 and 3. In FIG. 2, a point O denotes a point on a light-emitting surface of the liquid crystal device 1, ON denotes a normal vertically extending from the point O on the light-emitting surface, OP denotes a direction of light emitting from the point O, and OY denotes a direction in parallel with the light-emitting surface of the liquid crystal device 1 (reverse bright vision direction described later). Further, an angle $\theta$ denotes an angle, by which the light-emitting direction OP is tilted from the normal ON (elevation angle), an angle $\phi$ denotes an angle (azimuth angle) made by a plane PON with respect to a plane YON (plane including line segments OY and ON). As shown in FIG. 2, the rubbing direction A1 of the alignment film 8 makes the angle of 45 degrees with respect to the OY direction, and the rubbing direction A2 of the alignment film 11 makes the angle of 135 degrees with respect to the OY direction.

FIG. 3 shows a contour drawing representing a contrast ratio of light emitting from the light-emitting surface of the liquid crystal device 1 to the OP direction ($\theta$, $\phi$). In the drawing, the contrast ratio is increased in the center and gradually reduced toward the periphery. FIG. 3 is denoted by means of polar coordinates, in which a radial coordinate represents the elevation angle $\theta$, and an angle coordinate thereof represents the azimuth angle $\phi$. According to the drawing, the contrast ratio in the light-emitting surface of the liquid crystal device 1 shows the anisotropy with a small contrast in a Y direction (direction of φ=zero degree) and a large contrast in a direction reverse to the Y direction (direction of φ=180 degrees).

FIG. 4A shows a contrast characteristic in a plane vertical to a plane including the direction OY and the line segment ON and also vertical to the light-emitting surface of the liquid crystal device 1 (plane of φ=90 degrees and φ=270 degrees). FIG. 4B shows a contrast characteristic in the plane including the direction OY and the line segment ON (plane of φ=zero degree and φ=180 degrees). As shown in FIG. 4A, the contrast characteristic in the plane of φ=90 degrees and φ=270 degrees exhibits a lateral symmetry centered on the line segment ON. On the other hand, as shown in FIG. 4B, referring to the contrast characteristic in the plane of φ=zero degree and φ=180 degrees, the contrast ratio exhibits its peak at a position being tilted in the azimuth of φ=180 degrees, while the contrast ratio considerably drops when deviated from the position. Therefore, the contrast ratio remarkably decreases in the azimuth of φ=zero degree.

In the case of exhibiting such a contrast anisotropy, a φ direction, where a maximum point of the contrast ratio is disposed, is called a bright vision azimuth, while a φ direction reverse to the φ direction is called a reverse bright vision azimuth. In the present case, the Y direction constitutes the reverse bright vision azimuth. In the specification, a direction in a third-dimensional space, where light having a higher contrast ratio enters and emits with respect to the liquid crystal device is called a bright vision direction. A direction in the third-dimensional space having the same elevation angle θ as in the bright vision direction on a side, where light having a lower contrast ratio enters and emits with respect to the liquid crystal device, is called a reverse bright vision direction. The bright vision azimuth is a two-dimensional azimuth, where the light having the higher contrast ratio is emitted when viewing the liquid crystal device from the light-emitting-surface side. The reverse bright vision azimuth is a two-dimensional azimuth, where the light having the lower contrast ratio is emitted when viewing the screen from the light-emission side. The bright vision azimuth and the bright vision direction are identical to each other, and the reverse bright vision azimuth and the reverse bright vision direction are identical to each other when viewing from a direction vertical to the light-emitting surface, while they are respectively reverse to each other when viewing from the light-entering side.

The projection type image display apparatus, which is designed to send out bright parallel ray from a light source, employs a light source 21 configured in such a manner as shown in FIG. 5. The light source 21 is comprised of a lamp 22, such as a xenon lamp disposed backward, and a reflecting mirror 23 disposed behind the lamp 22 and having a shape of rotational parabolic surface, wherein light emitted from the lamp 22 is reflected by means of the reflecting mirror 23 to be thereby converted into the substantially parallel ray and emitted forward.

The light emitted from the light source 21 is similar to the parallel ray, however is actually an emission light having a light volume distribution in a donut-shape with a dark center part. Therefore, a lens optical system (not shown), which serves to illuminate the light volume distribution in a substantially uniform manner on a liquid crystal screen, is generally formed between the liquid crystal and the light source. The lens optical system serves to uniform the light volume of the light emitted from the light source on the liquid crystal surface. However, the light volume of the light entering the liquid crystal screen marks its peak in a light-entering direction α and a spread angle in the light-entering direction results in around 2α on one side (see FIG. 22A). FIG. 6 shows an angle distribution of an emitting light volume in the plane including the OY direction and the line segment ON (plane of φ=zero degree and φ=180 degrees), which shows the contrast ratio in the bright vision/reverse bright vision directions (same as in FIG. 4B) a broken line. When the elevation angle θ in the bright vision direction at a peak point therein is represented by θo, the θo is around a few degrees (<α).

As described, there is very little light vertically entering the liquid crystal device 1 from the light source 21. The light from the light source 21 enters the liquid crystal device 1 slantwise with a spread of 2·α and at a tilt of around α. Therefore, the light entering the liquid crystal device 1 from the reverse bright vision direction is blocked by the light blocking film 12 and the black matrix region 7. As a result, the contrast in the liquid crystal device 1 is relatively increased. As shown in FIG. 7, however, the light entering the liquid crystal device 1 from the bright vision direction is also blocked in part by the light blocking film 12 and the black matrix region 7 (In FIG. 7, light-blocking area is hatched). Thus, the liquid crystal device 1 configured in the manner as shown in FIG. 1 had the problem that the screen is darkened.

FIG. 8 shows a schematic illustration of a liquid crystal device 13 having a conventional configuration in a cross-section view. The liquid crystal device 13 employs a lens array substrate 14 as the counter substrate in place of the glass substrate. The lens array substrate 14 has an integral multilayer structure, in which a lens layer 15 having lens patterns and a refractivity of n1 and a flat glass 17 are attached to each other by means of an adhesive 16 having a refractivity of n2 (<n1). In a boundary between the lens layer 15 and the adhesive 16 is formed a micro lens array 18. Respective micro lenses constituting the micro lens array 18 are arrayed as opposed to the respective pixel electrodes 6 of the TFT substrate 2.

In the foregoing liquid crystal device 13, light entering from the bright vision direction is converged on the pixel electrodes 6 of the liquid crystal device 13 through the respective micro lenses as shown in FIG. 8, thereby making it difficult for the light from the bright vision direction to be blocked by the light blocking film 12 and the black matrix region 7. Light can be thus more efficiently utilized to thereby brighten a screen of the liquid crystal device 13.

The light emitted from the light source 21 is a light with a relatively small tilt and narrow spread as shown in a thick continuous line in FIG. 6. When the light from the light source passes through the micro lens array 18, an optical axis of the light is largely tiled and the spread thereof is broadened as shown in a thin continuous line in FIG. 6. In particular, light coming from the reverse bright vision direction is spread to a range of a very poor contrast. Such a light from the reverse bright vision direction is also converged on the pixel electrodes 6. As a result, the light blocking film 12 and the black matrix region 7 does not serve well to block the light, thereby creating the problem that a contrast of the liquid crystal device 13 is lowered.

In the projection type image display apparatus, an image brightness and contrast are very important factors. However, in the conventional technology, when such a liquid crystal device 1 as shown in FIG. 1 is used, the brightness is undermined, while the contrast is undermined when such a liquid crystal device 13 as shown in FIG. 8 is used. Therefore, it was difficult to obtain a liquid crystal device suitable for practical use.

According to a liquid crystal device 19 recited in No. 2001-249316 of the Publication of the Unexamined Patent Applications (cited reference 1), an optical center axis of respective micro lenses constituting a micro lens array 20 in a lens array substrate 14 is shifted in parallel with a bright vision-azimuth side with respect to a center position of pixel openings (pixel electrodes 6) in a TFT substrate 2 to thereby improve a contrast.

FIG. 9 shows a partial section of a schematic configuration of the liquid crystal device 19. In the liquid crystal device 19, a lens array substrate 14 has an integral multilayer structure, in which a lens layer 15 having lens patterns and a refractivity of n1 and a flat glass 17 are attached to each other by means of an adhesive 16 having a refractivity of n2 (>n1). In a boundary between the lens layer 15 and the adhesive 16 is formed a micro lens array 20. Further, the optical center axis of the micro lenses constituting the micro lens array 20 is shifted in parallel with the bright vision azumuth, and an edge of the respective micro lenses on the bright vision-azimuth side is formed in a plane vertical to the lens array substrate 14.

According to the liquid crystal device 19, the optical center axis of the micro lenses is shifted to the bright vision azimuth. Therefore, as shown in FIG. 9, light entering the liquid crystal device 19 from a bright vision direction transmits through the micro lenses to be thereby converged on the pixel electrodes 6 as tilted in the bright vision direction. On the contrary, light having a low contrast entering the liquid crystal device 19 from a reverse bright vision direction is refracted by the micro lenses to be thereby blocked by a blocking film 12 of a counter substrate 3 and a black matrix region 7 of a TFT substrate 2.

Therefore, according to the liquid crystal device 19, the incoming light is converged by means of the micro lens array to thereby more efficiently utilize light and realize a bright image display. Further, because such a simple configuration that the optical center axis of the micro lenses is shifted to the bright vision azimuth is employed, vertically incoming light is twisted to the bright vision direction to thereby transmit through the liquid crystal and, further, light entering from the reverse bright vision direction is blocked, thereby achieving a display having a high contrast. In other words, a liquid crystal device, in which the brightness is not really lost and a display of a good contrast characteristic is achieved, can be manufactured.

FIG. 10 shows a liquid crystal device 19 according to another embodiment, which is configured and exerts an effect in a substantially same manner as in the liquid crystal device 19 shown in FIG. 9. In the liquid crystal device 19 of FIG. 10, an edge of the respective micro lenses on the bright vision-azimuth side is rounded.

However, in the liquid crystal device 19 configured in the foregoing manner, as shown in FIG. 11, when light in the reverse bright vision direction enters a substantially vertical region disposed on the edge of the micro lens on the bright vision-azimuth side (hereinafter, referred to as non-continuous surface of micro lenses), the light transmits through the pixel electrodes 6 of the TFT substrate 2 and is emitted to the reverse bright vision direction, which lowers an image contrast. Further, as shown in FIG. 11, when light enters the non-continuous surface of the micro lenses from the bright vision direction, the light is emitted to a direction largely deviated from the opposed counter pixel electrodes 6. The light, then, enters the adjacent pixel electrodes 6 and becomes stray light, which decreases the brightness and contrast of the image. The liquid crystal device 19 of FIG. 10 having a curved part corresponding to the non-continuous surface, which is not quite an ideal shape, also undergoes the same behavior of light. As a result, it was actually difficult to improve the contrast of the liquid crystal device 19 in the case of the liquid crystal device 19 having the configuration shown in FIGS. 9 and 10.

SUMMARY OF THE INVENTION

The present invention has been proposed in terms of the described technical issues, and a main object thereof is to provide a lens array capable of improving an image contrast while controlling the reduction of an image brightness to a minimum level and a projection type image display apparatus using the lens array.

A first lens array according to the present invention is comprised of a plurality of lenses and used for a liquid crystal device and is characterized in that the lenses have a rotational aspheric surface, and an optical center axis thereof is tilted from a direction vertical to a lens array surface. The optical center axis in the description is a rotational center axis of the lens surface having the rotational aspheric surface shape.

The first lens array, wherein the optical center axis of the lenses is tilted from the direction vertical to the lens array surface, is used for the liquid crystal device to thereby improve the contrast while maintaining the brightness in the liquid crystal device.

In an embodiment of the present invention, the first lens array is formed in a boundary between two transparent media, wherein a refractivity of the transparent medium disposed on a light-emitting side is higher than a refractivity of the transparent medium disposed on a light-entering side, and the optical center axis of the lenses is tilted in a bright vision direction of liquid crystal. The lens surface in the present embodiment is protruded toward the light-entering side in terms of a relationship between the refractivities. In such a case, the optical center axis of the lenses is tilted in the bright vision direction of the liquid crystal so that the contrast is improved while maintaining the brightness in the liquid crystal device.

In another embodiment of the present invention, the first lens array is formed in a boundary between two transparent media, wherein a refractivity of the transparent medium disposed on a light-entering side is higher than a refractivity of the transparent medium disposed on a light-emitting side, and the optical center axis of the lenses is tilted in a reverse bright vision direction of liquid crystal. The lens surface in the embodiment is protruded toward the light-emitting side in terms of a relationship between the refractivities. In such a case, the optical center axis of the lenses is tilted in the reverse bright vision direction of the liquid crystal so that the contrast is improved while maintaining the brightness in the liquid crystal device.

According to still another embodiment of the present invention, the first lens array is characterized in that, when a focal length of the lenses is represented by f, a pitch of the lenses is represented by 2D, a distance between the lenses and liquid crystal is represented by L, and an elevation angle in a reverse bright vision direction of the liquid crystal when a contrast ratio of the liquid crystal is half a value of a maximum value is represented by $\theta 1$, the following formula is satisfied.

$$L \leq f \leq D/\tan \theta 1.$$

The foregoing formula is satisfied to thereby manufacture the liquid crystal device having a more brightness and higher contrast.

According to still another embodiment of the present invention, the first lens array is characterized in that, when an elevation angle in a reverse bright vision direction of the liquid crystal when a contrast ratio of liquid crystal is half a value C1 of a maximum value is represented by θ1, the contrast ratio when the elevation angle in a bright vision direction of the liquid crystal is θ1 is represented by C2, and a tilt of an optical center axis of the lenses is represented by α, the following formula is satisfied.

$$\alpha \leq \gamma(1-C1/C2) \text{ (Note } \gamma \text{ is a constant of } \Gamma \approx 20)$$

The foregoing formula is satisfied to thereby manufacture a liquid crystal device having a more brightness and higher contrast.

A second lens array according to the present invention is comprised of a plurality of lenses and used for a liquid crystal display apparatus of a TN type. The second lens array is characterized in that the lenses are formed in such manner that a focal length fx in a cross-section surface including a direction connecting a bright vision direction and a reverse bright vision direction of liquid crystal and an optical axis of the lenses (referred to as cross-section surface in bright vision direction—reverse bright vision direction) is longer than a focal length fy in a cross-section surface including a direction orthogonal to the direction connecting the bright vision direction and the reverse bright vision direction of the liquid crystal and the optical axis of the lenses (referred to as cross-section surface in direction orthogonal to bright vision direction—reverse bright vision direction).

In the second lens array, the focal length in the cross-section surface in the bright vision direction—reverse bright vision direction is set to be longer to thereby reduce a light emission angle, and the focal length in the cross-section surface in the direction orthogonal to the bright vision direction—reverse bright vision direction is set to be shorter to thereby increase the light emission angle. Therefore, when second lens array is used in the liquid crystal device, a contrast can be improved while maintaining a brightness of the liquid crystal device. The lenses constituting the second lens array are not asymmetrically formed unlike the first lens array, therefore can be more easily designed.

In an embodiment of the present invention, the second lens array is characterized in that, when a pitch of the lenses is represented by 2D, a divergence angle of an incident light with respect to the lenses is represented by 2d, an angle, at which a contrast ratio on a reverse-bright-vision side in a cross-section surface including a direction connecting a bright vision direction and a reverse bright vision direction of the liquid crystal and an optical axis of the lenses is ½ of a maximum value, is represented by θ1, and an angle, at which the contrast ratio in a cross-section surface including a direction orthogonal to the direction connecting the bright vision direction and the reverse bright vision direction of the liquid crystal and the optical axis of the lenses is ½ of the maximum value, is represented by θ2, a focal length fx of the lenses in the cross-section surface including the direction connecting the bright vision direction and the reverse bright vision direction of the liquid crystal and the optical axis of the lenses and a focal length fy of the lenses fy in the cross-section surface including the direction orthogonal to the direction connecting the bright vision direction and the reverse bright vision direction of the liquid crystal and the optical axis of the lenses satisfy the following formulas.

$$fx \leq D/\tan(\theta 1-d)$$

$$fy \leq D/\tan(\theta 2-d)$$

The foregoing formulas are satisfied to thereby manufacture a liquid crystal device having a more brightness and higher contrast ratio.

In another embodiment of the present invention, the second lens array is characterized in that, when a pitch of the lenses is represented by 2D, a divergence angle of an incident light with respect to the lenses is represented by 2d, angles, at which contrast ratios on a reverse-bright-vision side in a cross-section surface including a direction connecting a bright vision direction and a reverse bright vision direction of the liquid crystal and an optical axis of the lenses are ½ and ⅓ of a maximum value, are respectively represented by θ1 and θ3, and angles, at which the contrast ratios in a cross-section surface including a direction orthogonal to the direction connecting the bright vision direction and the reverse bright vision direction of the liquid crystal and the optical axis of the lenses are ½ and ⅓ of the maximum value, are respectively represented by θ2 and θ4, a focal length fx of the lenses in the cross-section surface including the direction connecting the bright vision direction and the reverse bright vision direction of the liquid crystal and the optical axis of the lenses and a focal length fy of the lenses in the cross-section surface including the direction orthogonal to the direction connecting the bright vision direction and the reverse bright vision direction of the liquid crystal and the optical axis of the lenses satisfy the following formulas.

$$D/\tan(\theta 1-d) \leq fx \leq D/\tan(\theta 3-d)$$

$$D/\tan(\theta 2-d) \leq fy \leq D/\tan(\theta 4-d)$$

The foregoing formulas are satisfied to thereby manufacture a liquid crystal device having a more brightness.

In still another embodiment of the present invention, the second lens array is characterized in that, when a pitch of the lenses is represented by 2D, a divergence angle of an incident light with respect to the lenses is represented by 2d, angles, at which contrast ratios on a reverse-bright-vision side in a cross-section surface including a direction connecting a bright vision direction and a reverse bright vision direction of the liquid crystal and an optical axis of the lenses are ⅓ and ⅔ of a maximum value, are respectively represented by θ3 and θ5, and angles, at which the contrast ratios of the liquid crystal in a cross-section surface including a direction orthogonal to the direction connecting the bright vision direction and the reverse bright vision direction of the liquid crystal and the optical axis of the lenses are ⅓ and ⅔ of the maximum value, are respectively represented by θ4 and θ6, a focal length fx of the lenses in the cross-section surface including the direction connecting the bright vision direction and the reverse bright vision direction of the liquid crystal and the optical axis of the lenses and a focal length fy of the lenses in the cross-section surface including the direction orthogonal to the direction connecting the bright vision direction and the reverse bright vision direction of the liquid crystal and the optical axis of the lenses satisfy the following formulas.

$$D/\tan(\theta 5-d) \leq fx \leq D/\tan(\theta 3-d)$$

$$D/\tan(\theta 6-d) \leq fy \leq D/\tan(\theta 4-d)$$

The foregoing formulas are satisfied to thereby manufacture a liquid crystal device having a higher contrast.

In still another embodiment of the present invention, the second lens array is characterized in that the respective lenses have a non-lens portion having a plane surface or a convex shape in a boundary between the adjacent lenses.

When the lenses are designed in such manner, a light-emission angle can be also controlled in the boundary of the lenses.

The projection type image display apparatus according to the present invention comprises a lens array characterized as in the first lens array or the second lens array. The respective lenses of the lens array are designed in such manner that a larger light volume is entering pixels from the bright vision direction, and a smaller light volume is entering the pixels from the reverse bright vision direction. Therefore, an image display apparatus achieving a high contrast can be obtained.

The components so far described in the present invention can be combined as differently as possible.

BRIEF DESCRIPTION OF THE DRAWINGS

FIG. 2B shows a light volume distribution of light entering the liquid crystal 34 when the micro lenses 47 are tilted by the deflection angle $\alpha$=five degrees.

FIG. 25B shows a distribution of a contrast ratio in the direction orthogonal to the bright vision direction—the reverse bright vision direction.

FIG. 28 shows a result of comparing brightness (effective opening rate) and contrast in the liquid crystal device 31, with respect to the case of not using micro lenses, the case of using conventional micro lenses, and the case of using the micro lens array 46 according to the present invention.

DESCRIPTION OF THE PREFERRED EMBODIMENTS

Figure 12:
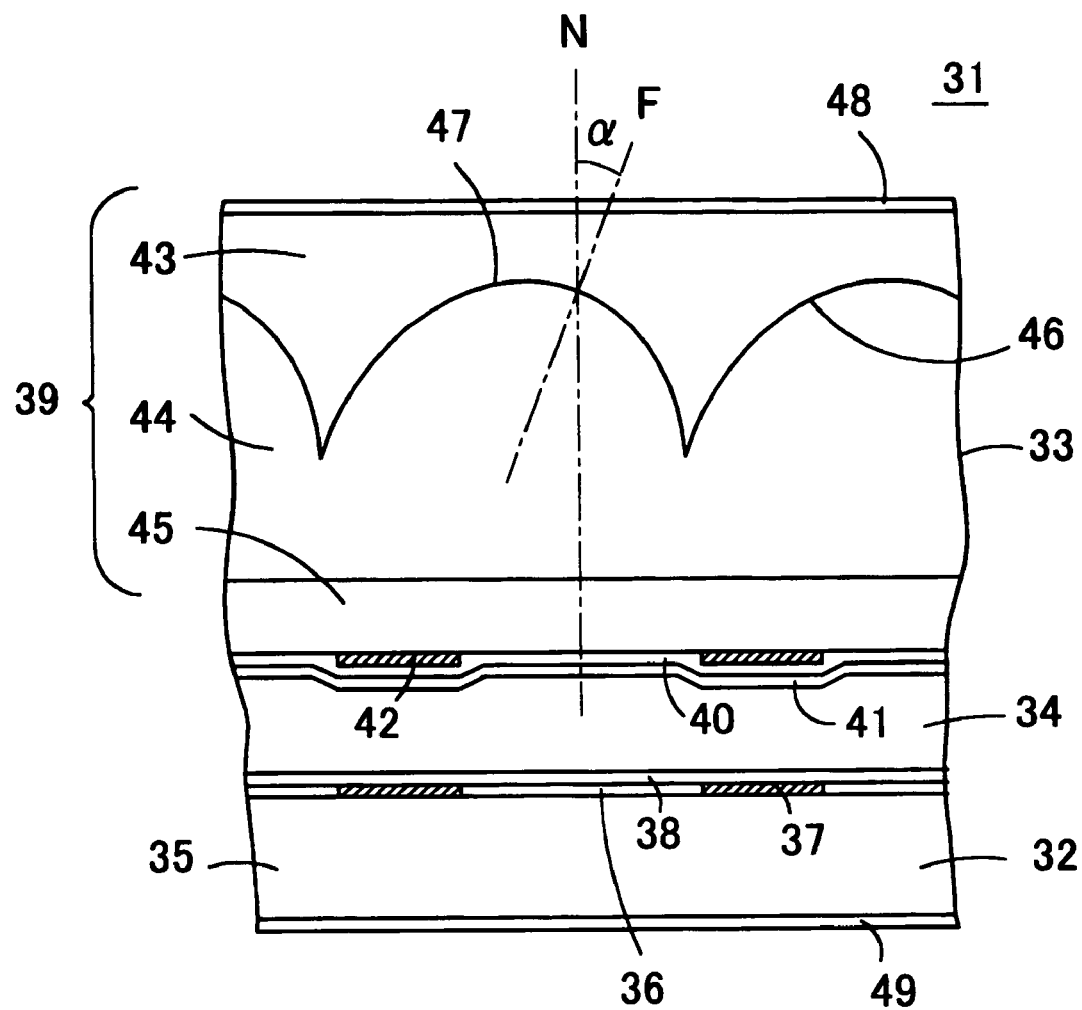
FIG. 12 shows a cross-sectional schematic illustration of a part of a configuration of a liquid crystal device 31 according to an embodiment of the present invention.

FIG. 12 shows a partial section of a schematic configuration of a liquid crystal device 31 according to an embodiment of the present invention. The liquid crystal device 31 is a liquid crystal device of a TN mode used as a light valve of, for example, a projection type image display apparatus. The liquid crystal device 31 is mainly comprised of a TFT substrate 32, a counter substrate 33, liquid crystal 34 and a spacer (not shown). In the TFT substrate 32, pixel electrodes 36 are arrayed in an inner surface of a glass substrate 35 in a matrix shape, a black matrix region 37 is provided in a region surrounding the pixel electrodes 36, and an alignment film 38 made of a polyimide film, or the like, is provided on the pixel electrodes 36 and the black matrix region 37. The pixel electrodes 36 are formed in a window shape by means of a transparent electrode film (can be therefore called pixel openings). The black matrix region 37 is a region where TFTs for turning on/off the respective pixel electrodes 36, and wirings of data lines and scan lines are provided. The surface of the black matrix region 37 is covered with a black mask made of a metal material such as chrome, resin black, or the like, to thereby emphasize the pixels and prevent the generation of optical current in the TFTs.

Figure 13:
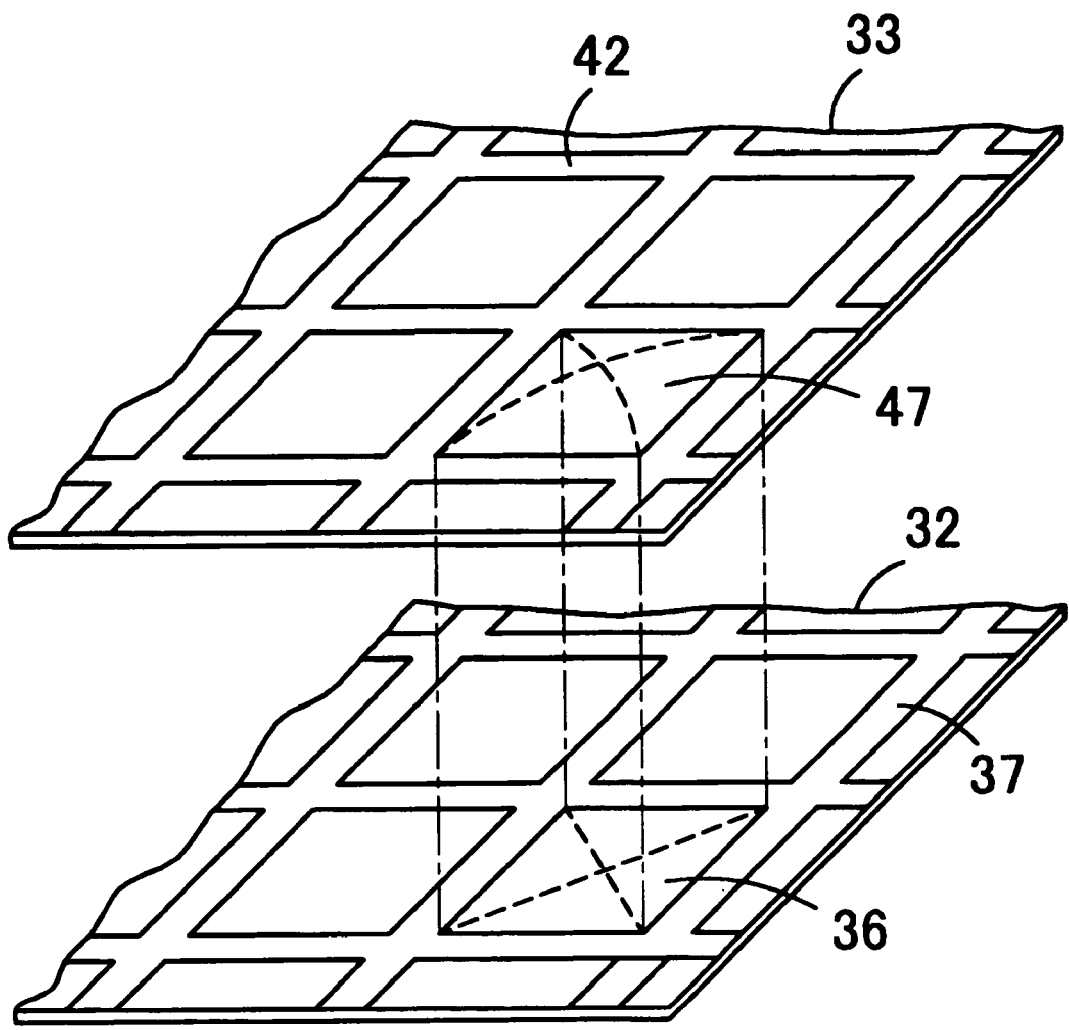
FIG. 13 shows a schematic perspective illustration of a position relationship between a black matrix region 37 of a TFT substrate 32 and a light blocking film 42 of a counter substrate 33.

In the counter substrate 33, transparent counter electrodes 40, such as ITO, and an alignment film 41 made of the polyimide film, or the like, are provided for an entire inner surface of a lens array substrate 39. The counter substrate 33 is also provided with a light blocking film 42 formed in a lattice shape and from a black mask made of a metal material, such as chrome, the resin black, or the like. The black matrix region 37 and the pixel openings of the TFT substrate 32 and the light blocking film 42 and openings of the counter substrate 33 are, as shown in a schematic perspective view of FIG. 13, are formed in such manner as opposed to each other. The spacer serves to maintain a space between the TFT substrate 32 and the counter substrate 33 at a fixed length and seal a periphery of the liquid crystal 34.

The lens array substrate 39 is comprised of a lens layer 43 made of transparent resin or transparent glass, a transparent adhesive layer 44, and a transparent flat glass 45. A plurality of lens patterns is formed in an inner surface of the lens layer 43, and an adhesive fills between the inner surface of the lens layer 43 and the flat glass 45. The lens layer 43 and the flat glass 45 are integrated with each other via the adhesive layer 44 to thereby form a multilayer structure. A micro lens array 46 is formed in an interface between the lens layer 43 and the adhesive layer 44 having different refractivities (NOTE: shape of micro lenses 47 is exaggerated to help understanding in FIG. 12). The respective micro lenses 47 constituting the micro lens array 46 have a shape of rotational symmetry centered on an optical center axis F thereof, for example, a shape of a rotational aspheric lens. In the present embodiment, the refractivity n2 of the adhesive layer 44 is larger than the refractivity n1 of the lens layer 43 (n1<n2), and the respective lenses 47 are protruded toward the lens-layer-43 side to thereby serve to exert an action as a convex lens.

First Embodiment

Figure 14A:
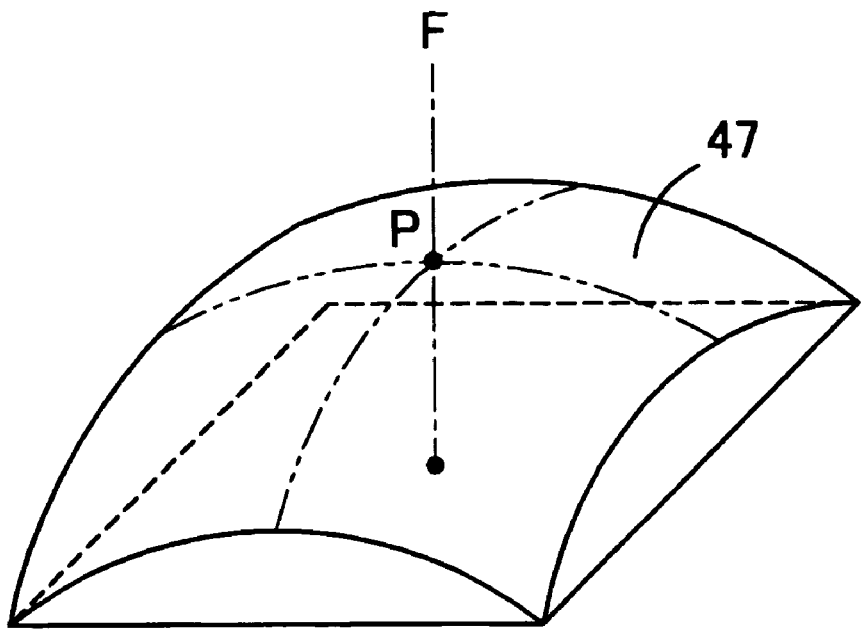
FIG. 14 shows a perspective illustration of a lens shape in a first micro lens array 46 according to the present invention.
Figure 14B:
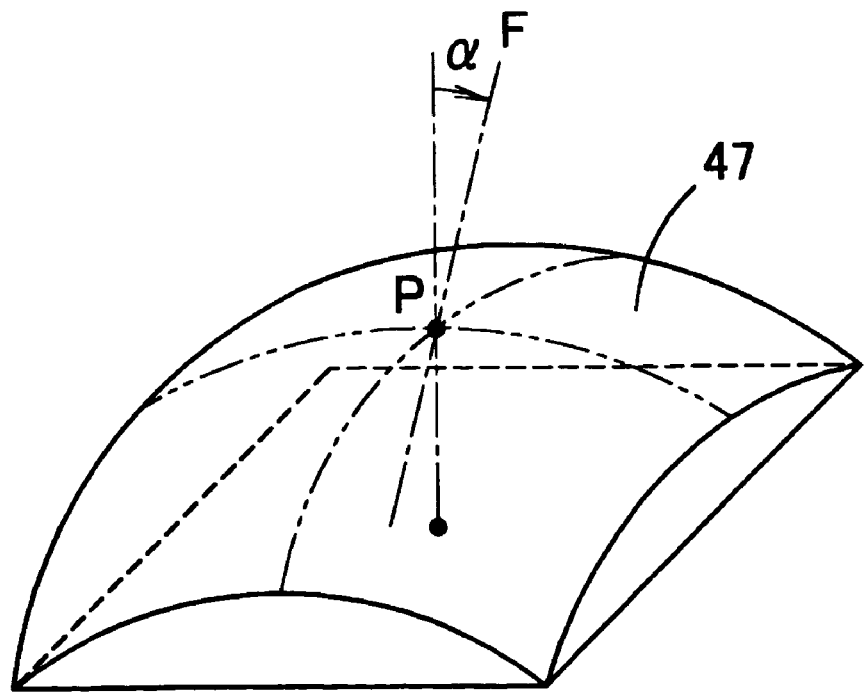

FIGS. 14A and B illustrate a lens shape of the lenses constituting the first micro lens array according to the present invention. FIG. 14A shows the state the optical center axis F of the micro lenses 47 (rotational center axis of lens surface) is vertical to the pixel electrodes 36. FIG. 14B shows the shape of the lenses constituting the first lens array.

Figure 15:
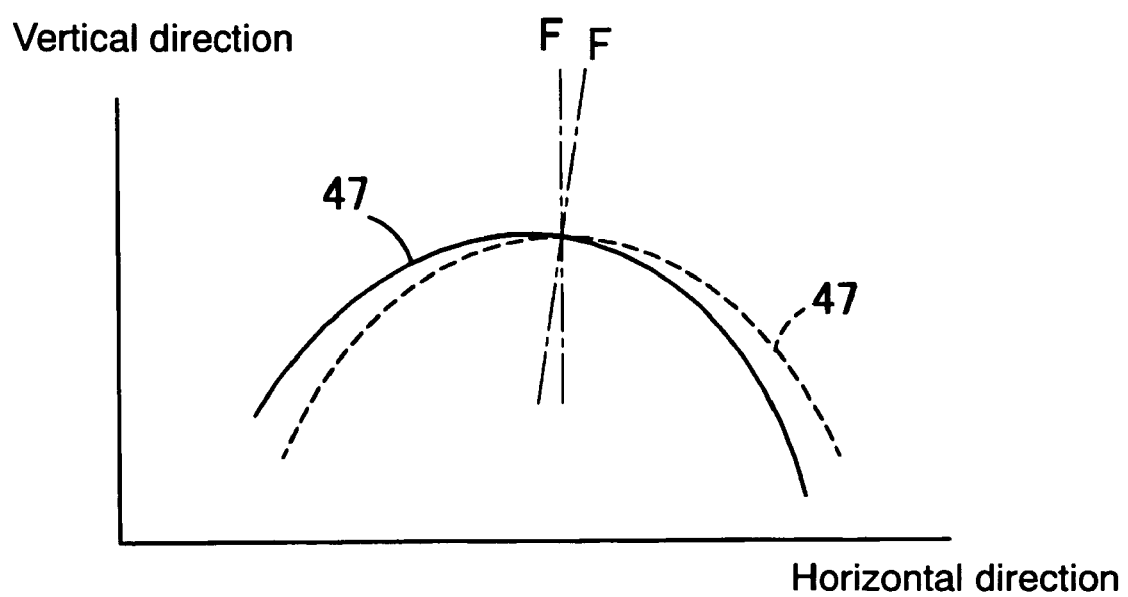
FIG. 15 shows how the shape of the lens surface changes when the micro lenses 47 are tilted.

When a point, at which the optical center axis F and the lens surface intersects with each other is represented by P (which is hypothetically called optical center of lens surface), the lens is tilted by an angle α to a bright vision direction centered on the optical center P. The respective micro lenses 47 constituting the micro lens array 46 are thus tilted in the bright vision direction. The intersection point (optical center) P of the lens surface and the optical center axis F is disposed on a perpendicular passing through a center of the pixel electrodes 36 (pixel openings). Further, when the micro lenses 47 are tilted in the bright vision direction, as shown in FIG. 15, an edge of the micro lenses 47 in a reverse bright direction azimuth is lowered, while an edge of the micro lenses 47 in a bright vision azimuth is raised. In such a state, a non-continuous surface is generated between the adjacent micro lenses 47. In present invention, in order to deal with the problem, the lens surface is lengthened at the edge thereof in the bright vision azimuth, while the lens surface is shrunk at the edge thereof in the reverse bright vision azimuth. In the foregoing manner, the lower surface of the tilted micro lenses 47 can be flat to thereby prevent the consecutive generation of the non-continuous surface between the micro lenses 47, as shown in FIG. 12. Such a fine lens pattern can be formed in the inner surface of the lens layer 43 using a stamper, or the like, in the case of the lens layer 43 being made of resin. As the adhesive layer 44, UV-ray cured resin is desirably used.

Figure 1:
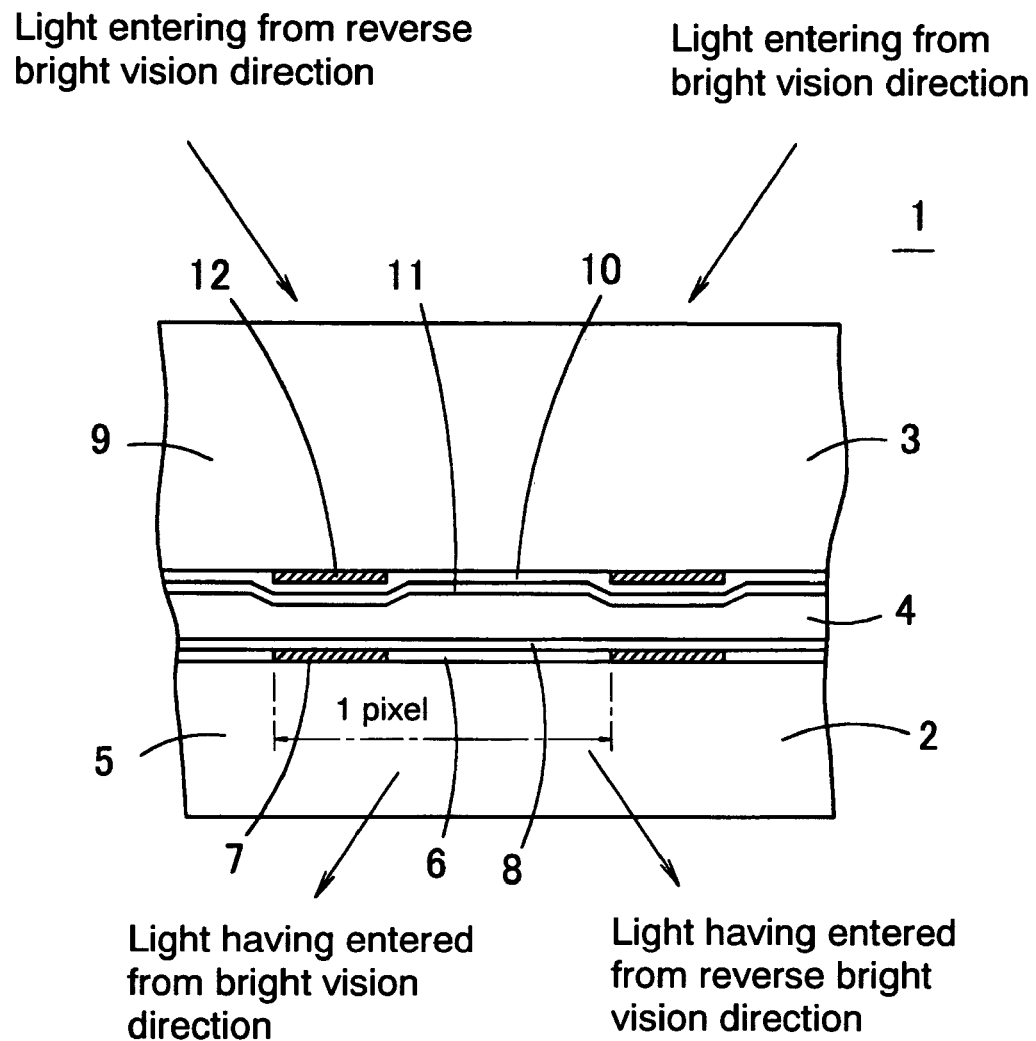
FIG. 1 shows a cross-sectional schematic illustration of a part of a configuration of a liquid crystal device 1 of a twisted nematic mode.
Figure 2:
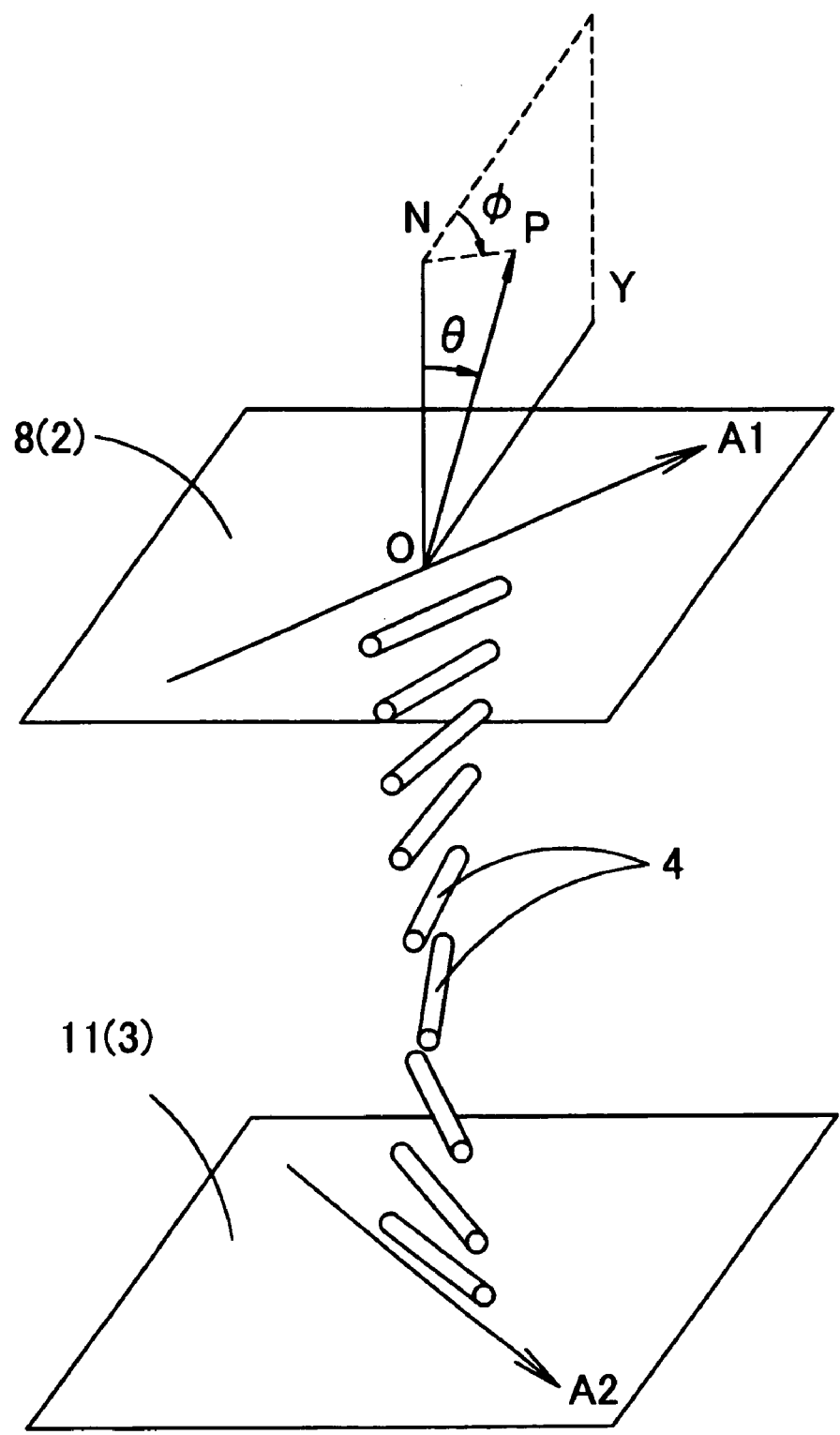
FIG. 2 shows a schematic illustration of a twist-oriented state of liquid crystal 34 sealed into between an alignment film 8 of a TFT substrate 2 and an alignment film 11 of a counter substrate 3.
Figure 3:
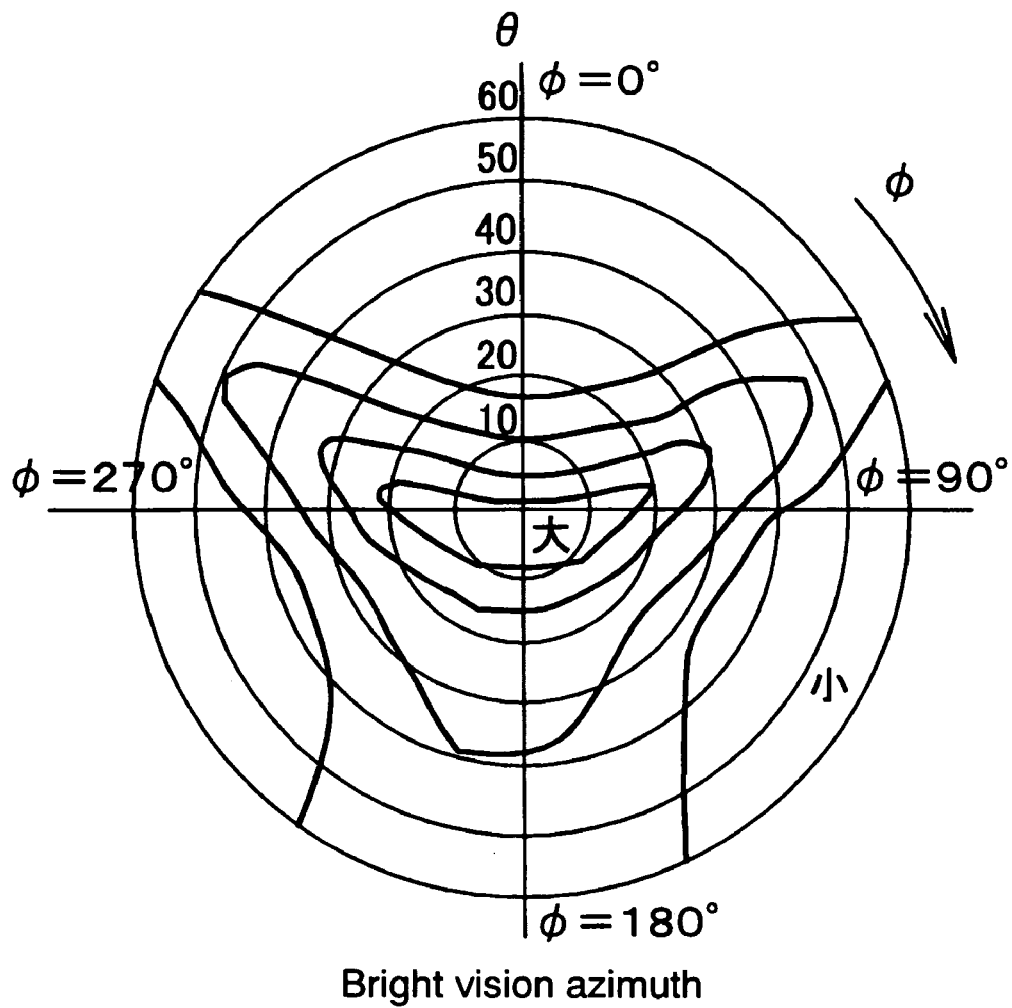
FIG. 3 shows a contour drawing representing a contrast ratio of light emitting from a light-emitting surface of the liquid crystal device 1.
Figure 4B:
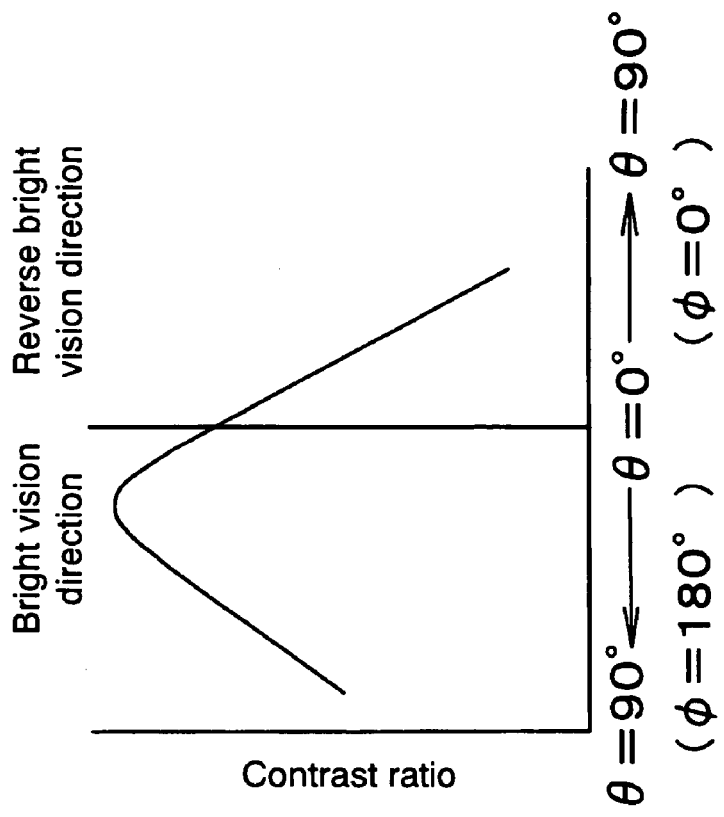
FIG. 4B shows a contrast characteristic in the plane including the direction OY and the line segment ON in FIG. 2.
Figure 4A:
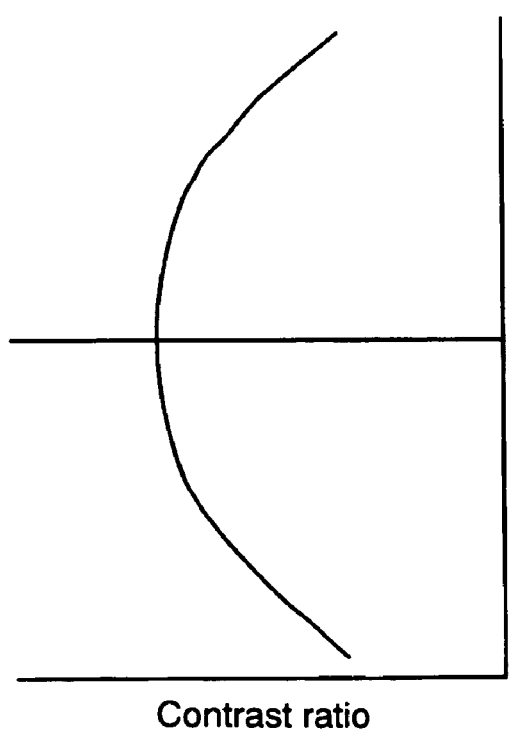
FIG. 4A shows a contrast characteristic in a plane vertical to a plane including a direction OY and a line segment ON shown in FIG. 2 and also vertical to a light-emitting surface of the liquid crystal device 1 in FIG. 2.
Figure 5:
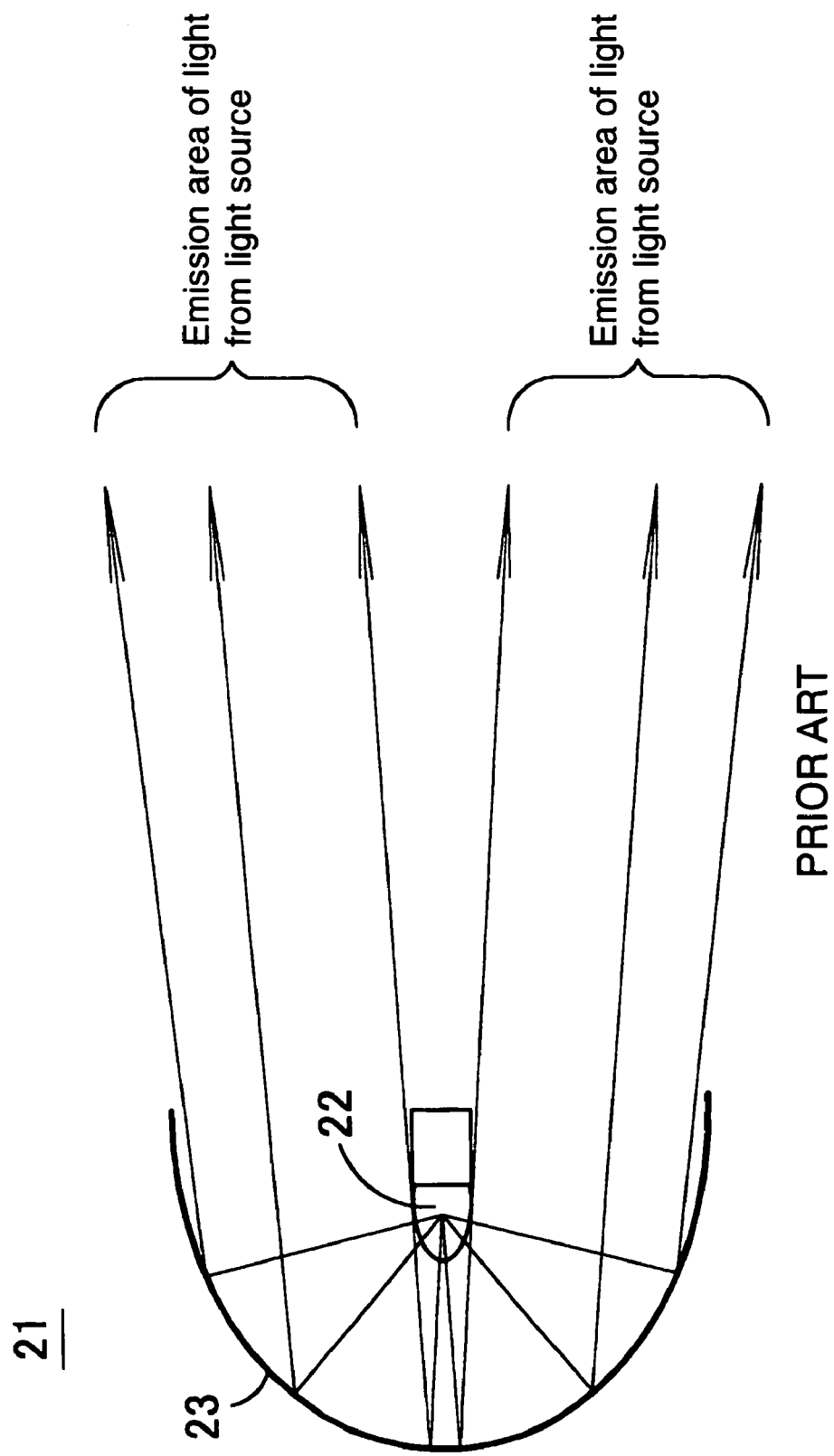
FIG. 5 shows a cross-sectional schematic illustration of a configuration of a light source 21 used for a projection type image display apparatus.

The TFT substrate 32 and the counter substrate 33 are disposed as opposed to each other via the spacer, and the liquid crystal 34 is sealed into between the alignment film 38 of the TFT substrate 32 and the alignment film 41 of the counter substrate 33. As the liquid crystal 34 to be sealed thereinto, liquid crystal of the TN mode twist-oriented by 90 degrees between the TFT substrate 32 and the counter substrate 33 by the alignment films 38 and 41 is used. The TN-mode liquid crystal is in the twist-oriented state by the angle of 90 degrees between the alignment film 38 of the TFT substrate 32 and the alignment film 41 of the counter substrate 33 (see FIG. 2 and the description). In a liquid crystal device using the liquid crystal 34, a contrast is high on the bright-vision-direction side despite a large elevation angle θ of light, while the contrast is extremely poor on the reverse-bright-direction side when the elevation angle θ is large (see FIGS. 3 and 4). In FIG. 12, a reference numeral 48 denotes a light-entering-side polarizing plate, and a reference numeral 49 denotes a light-emitting-side polarizing plate.

Figure 16:
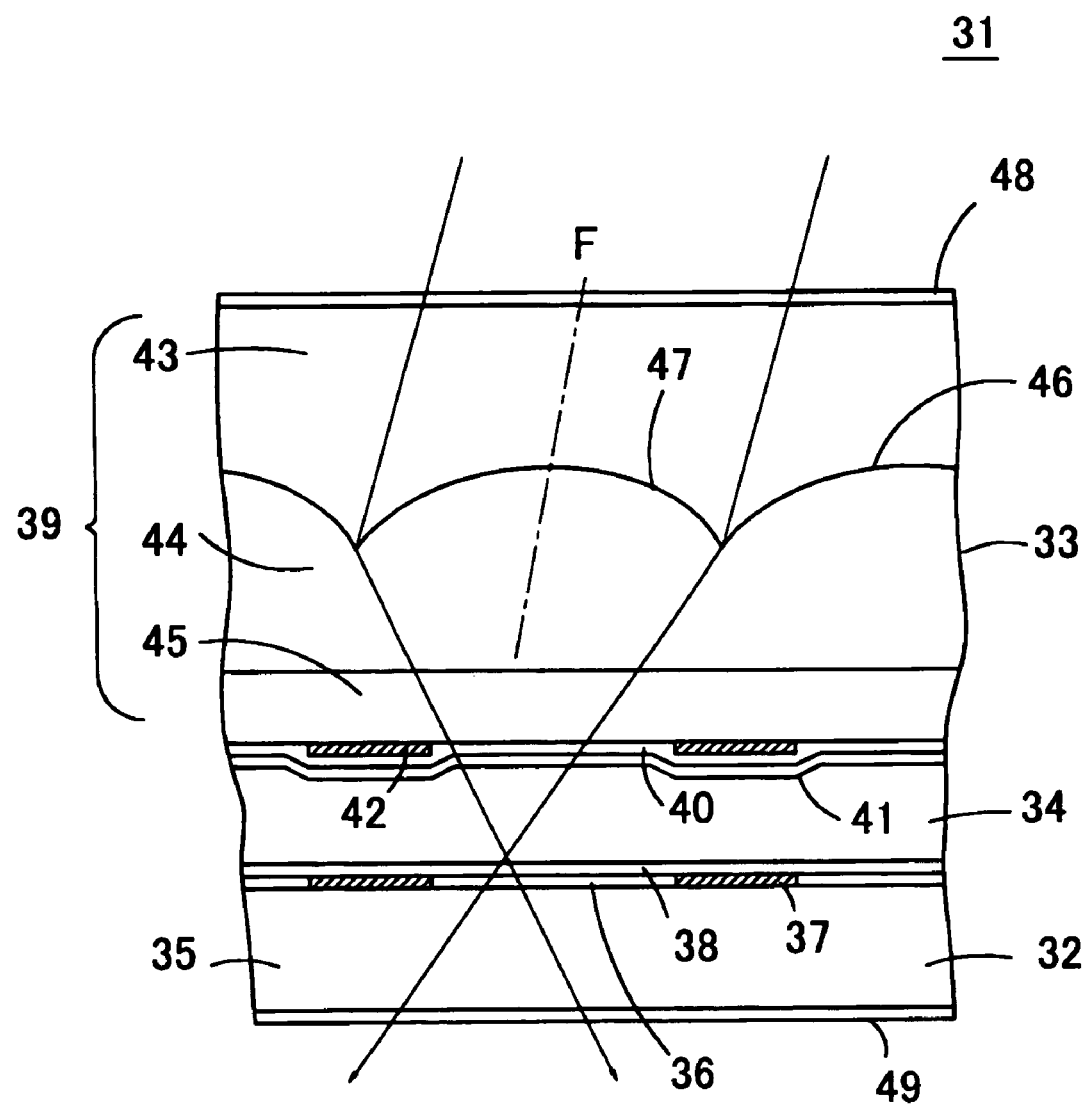
FIG. 16 shows a behavior of light entering slantwise the liquid crystal device 31 of FIG. 12 from a bright vision direction.

In the liquid crystal device 31, the micro lenses 47 are respectively provided as opposed to the pixel openings. Therefore, as shown in FIG. 16, light entering slantwise from the bright vision direction is converged in a neighborhood of the pixel electrodes 36 by means of the micro lenses 47, and then transmits through the pixel electrodes 36 to be thereby emitted from the TFT-substrate-32 side. Thus, the light entering from the bright vision direction is unlikely to be blocked by the light blocking film 42, which leads to a bright image obtained through the more efficient utilization of light. Further, because the micro lenses 47 are continuously formed with the optical center axis F thereof being tilted in the bright vision direction, the non-continuous region or any undesirable region as the lens surface is hardly generated between the micro lenses 47. Therefore, the light entering from the bright vision direction is hardly scattered in the non-continuous portion between the micro lenses 47 and emitted from the adjacent pixel opening as stray light. Such a configuration largely diminishes the concern regarding the reduction of the image brightness and the contrast.

Figure 17:
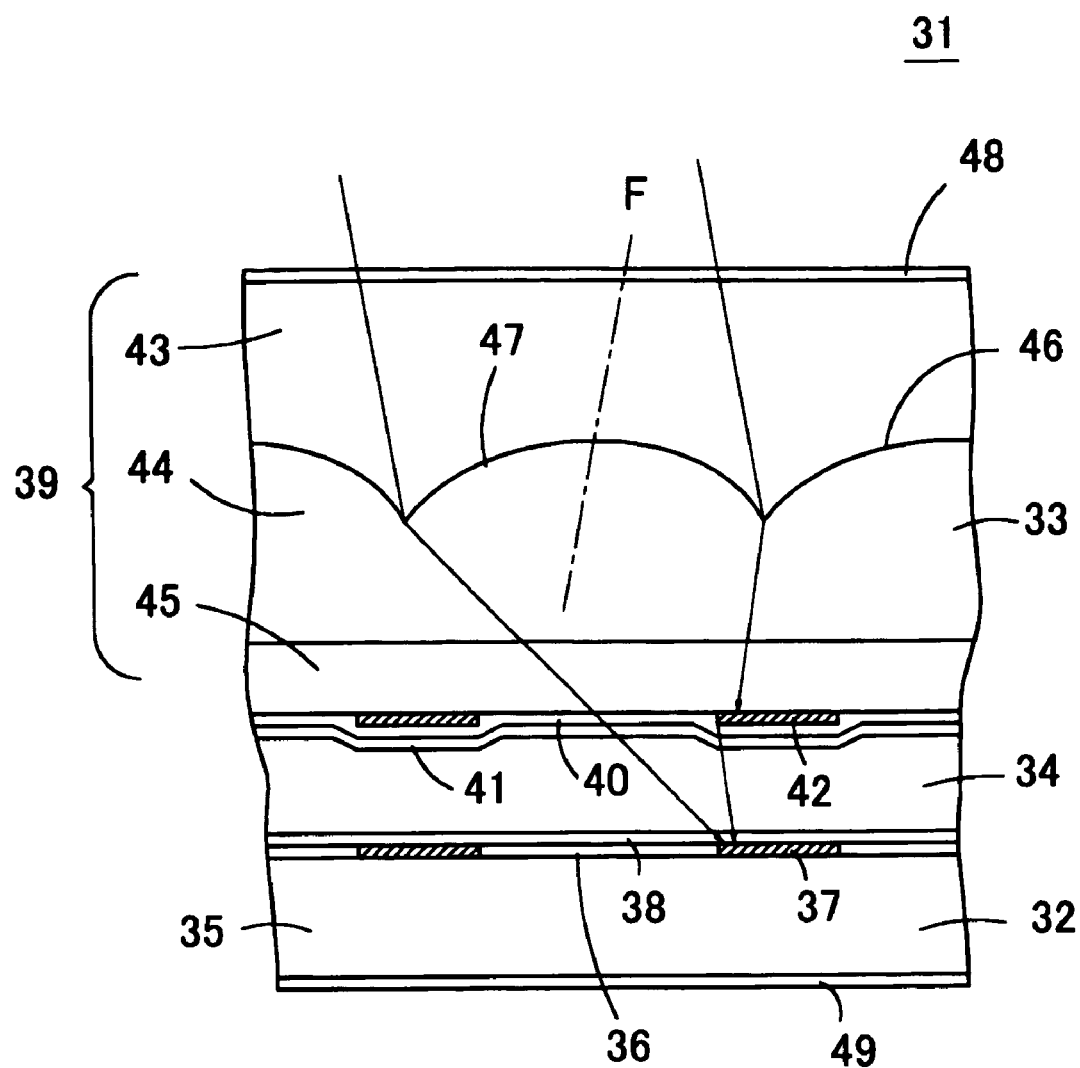
FIG. 17 shows a behavior of light entering slantwise the liquid crystal device 31 of FIG. 12 from a reverse bright vision direction.

On the other hand, as shown in FIG. 17, light of a low contrast entering slantwise from the reverse bright vision direction is refracted by the micro lenses 47, thereby heading for the light blocking film 42 of the counter substrate 33 or the black matrix region 37 of the TFT substrate 32. Then, the light is blocked by the light blocking film 42 or the black matrix region 37 and is unlikely to be emitted from the TFT-substrate-32 side. Further, as shown in FIG. 17, light of a low contrast entering slantwise a boundary region between the micro lenses 47 from the reverse bright vision direction is also refracted by the micro lenses 47, thereby heading for the light blocking film 42 of the counter substrate 33 or the black matrix region 37 of the TFT substrate 32. The light is blocked by the light blocking film 42 or the black matrix region 37, and the light is hardly emitted from the TFT-substrate-32 side.

Figure 6:
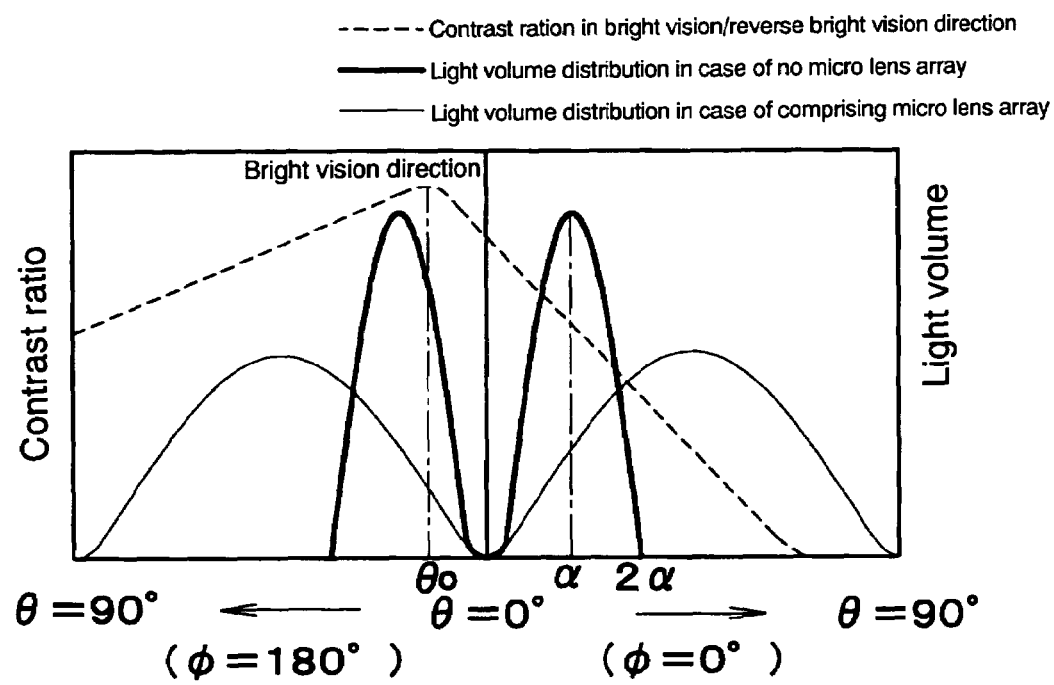
FIG. 6 shows a light volume distribution of light passing through liquid crystal 4, a light volume distribution of light not passing through micro lenses, and a light volume distribution of light passing through micro lenses.
Figure 7:
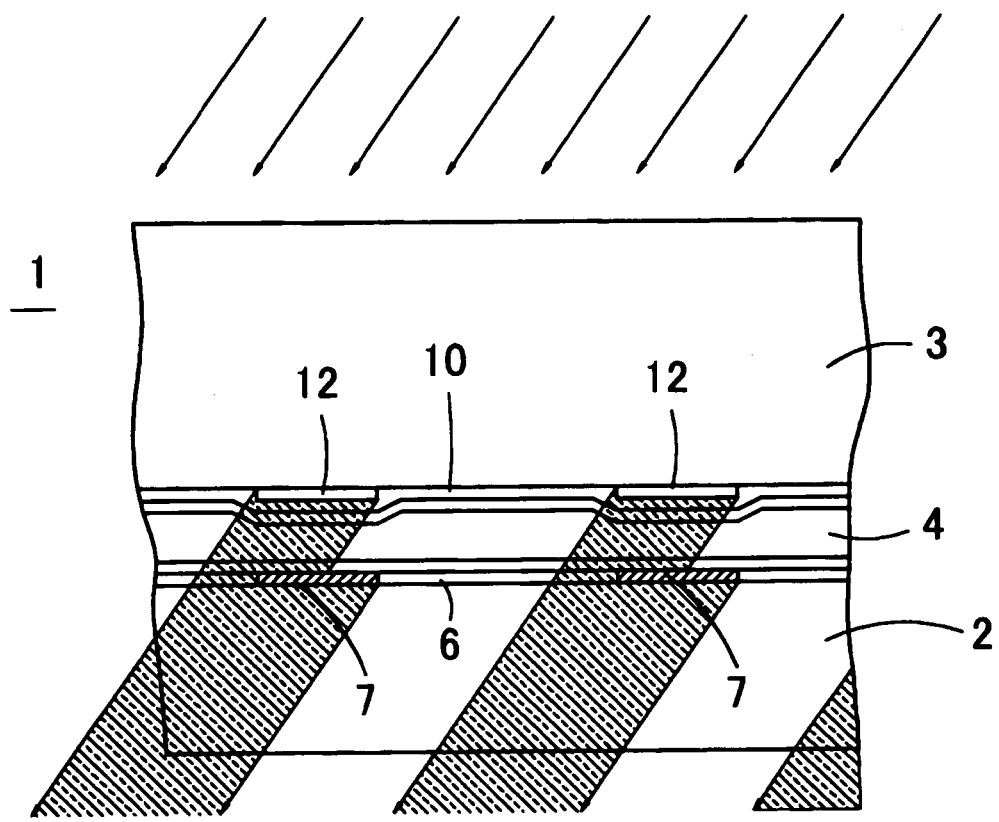
FIG. 7 shows how light entering the liquid crystal device 1 of FIG. 1 from a bright vision direction is blocked by a light blocking film 12.
Figure 8:
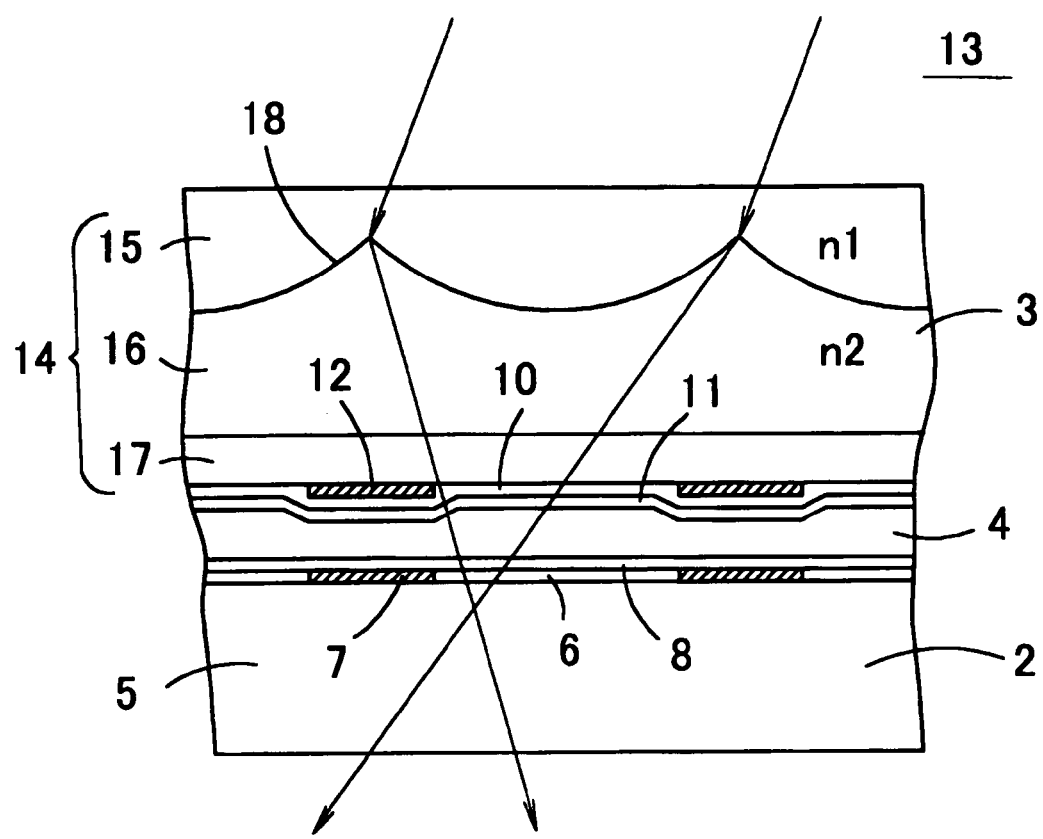
FIG. 8 shows a cross-sectional schematic illustration of a conventional liquid crystal device 13 having another configuration.
Figure 9:
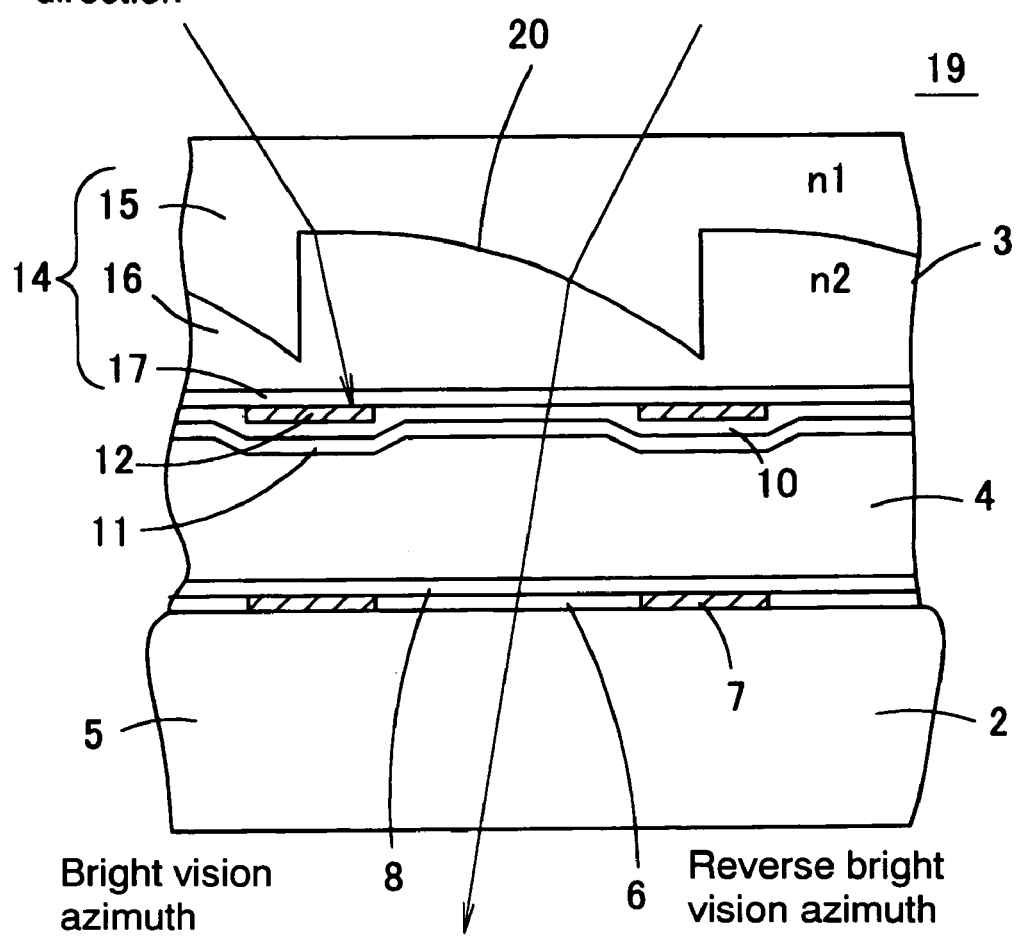
FIG. 9 shows a cross-sectional schematic illustration of a conventional liquid crystal device 19 having still another configuration.
Figure 10:
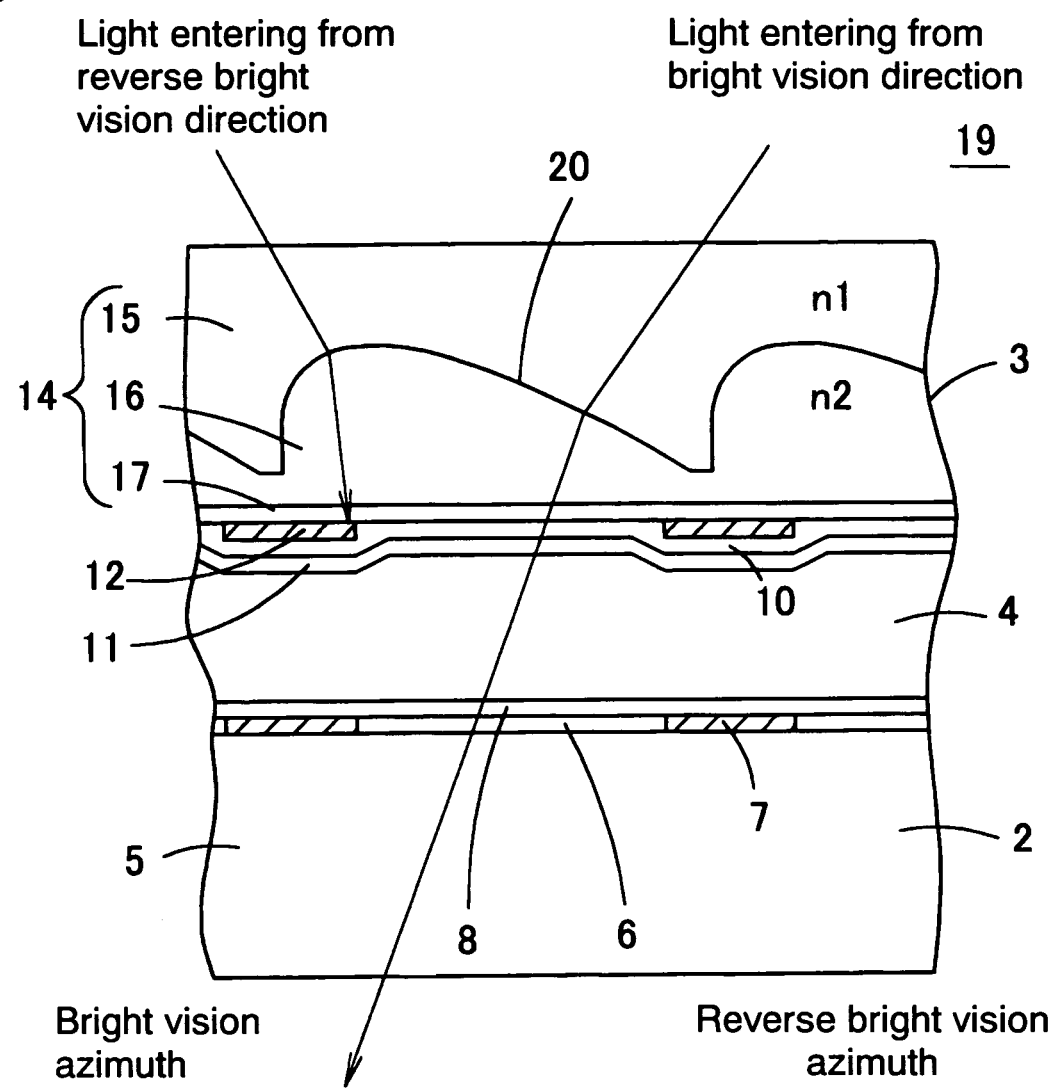
FIG. 10 shows a cross-sectional schematic illustration of the liquid crystal device 19 of FIG. 9 according to another embodiment.
Figure 11:
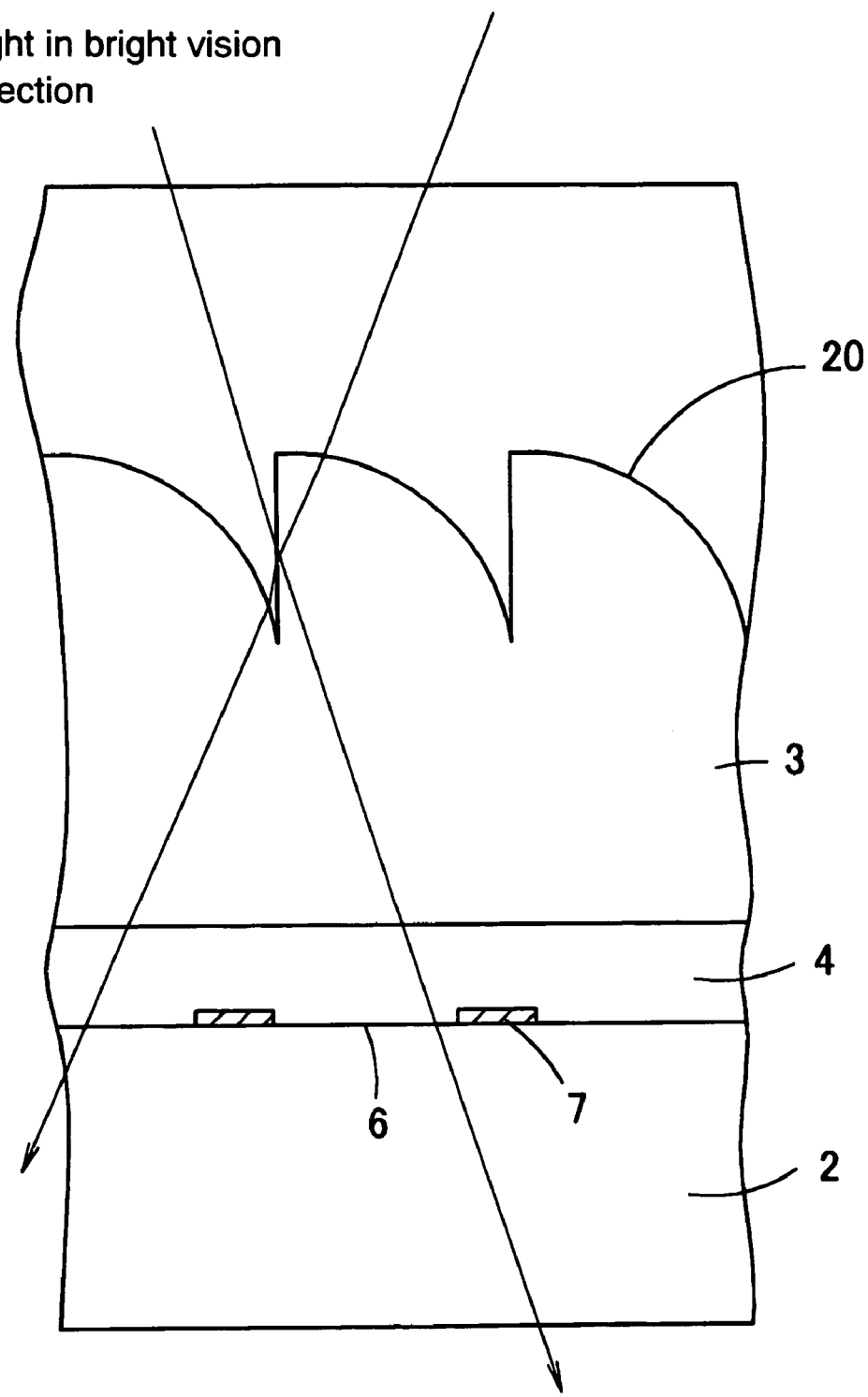
FIG. 11 shows an illustration of a problem in the liquid crystal device 19 in FIGS. 9 and 10.
Figure 18:
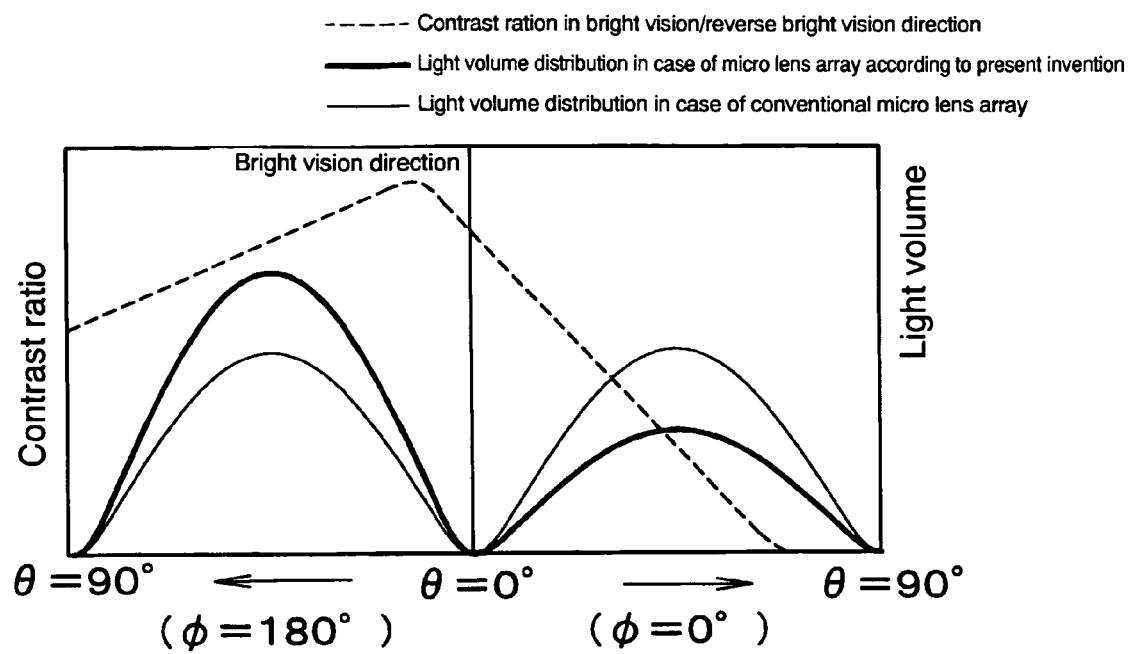
FIG. 18 shows a contrast ratio of light passing through liquid crystal 34, a light volume distribution of light passing through the micro lenses 47 which are not tilted, and a light volume distribution of light passing through the micro lenses 47 which are tilted.

When the respective micro lenses 47 constituting the micro lens array 46 are tilted in the bright vision direction, light in the bright vision direction is increased by transmitting through the micro lenses 47, while light in the reverse bright vision direction is decreased. To put it differently, when the optical center axis F of the micro lenses 47 has a vertical direction and the micro lenses 47 are thereby disposed in a horizontally even manner as shown in FIG. 14A, light volumes in the bright vision direction and in the reverse bright vision direction are equal to each other as in a light volume distribution shown in a thin continuous line in FIG. 18 (same as in FIG. 6). When the optical center axis F of the micro lenses 47 is tilted in the bright vision direction as shown in FIG. 14B, the light volume in the bright vision direction is increased, while the light volume in the reverse bright vision direction is decreased, as in a light volume distribution shown in a thick continuous line in FIG. 18. As a result, when the micro lenses 47 are tilted in the bright vision direction, as shown in FIG. 18, the light volume is increased in a region in the bright vision direction where the contrast is high, while the light volume is decreased in a region in the reverse bright vision direction where the contrast is low, resulting in an improved contrast on the whole.

According to the liquid crystal device 31, when the micro lenses having the vertically-directed optical center axis are used, the brightness is more or less undermined, however, light is more efficiently utilized to thereby brighten the image, and the light in the reverse bright vision direction is blocked to thereby increase the contrast. Therefore, in the liquid crystal device according to the present invention, problems included in a conventional liquid crystal device can be solved, and a liquid crystal device having a characteristic suitable for the use in the projection type image display apparatus can be manufactured. Further, in the liquid crystal device according to the present invention, the array of the micro lenses only requires the optical center axis of the aspheric lens (direction of main light) to be tilted in the bright vision direction, which simplifies the lens shape of the micro lens array 46 and, and the lenses can be thereby more easily designed.

As described, when the optical center axis F of the micro lenses 47 is tilted in the bright vision direction, light is partly blocked by the light blocking film 42 of the lens array substrate 39, or the like, to thereby reduce the light volume passing through the pixel openings and reduce the brightness. Below is described a method of designing the lens array substrate 39 capable of minimizing the reduction of the brightness and improving the contrast in the liquid crystal device 31.

Based on a contrast distribution in the bright vision direction and the reverse bright vision direction, which are shown in FIG. 19, an elevation angle $\theta_1$ in the reverse bright vision direction when a contrast ratio is half a value $C_1=C_p/2$ of a peak value $C_p$ is obtained. Further, a contrast ratio $C_2$ when the elevation angle is $\theta_1$ in the bright vision direction is obtained. Next, as shown in FIG. 20, when a distance from the micro lenses 47 to a focal point K (focal length) is represented by f, and a half pixel size of the micro lenses 47 is represented by D, a divergence angle $\theta_3$ of parallel ray emitted from the micro lenses 47 is represented by the following formula (1).

$$\tan\theta_3 = D/f \tag{1}$$

When the focal point K of the micro lenses 47 is disposed within a shorter distance with respect to the opening portion surrounded by the light blocking film 42, the divergence angle $\theta_3$ of light emitting from the liquid crystal device 31 is increased. Therefore, the focal point K of the micro lenses 47 is preferably disposed farther than the opening portion surrounded by the light blocking film 42. More specifically, representing the divergence angle of the parallel ray by $\theta_2$ when the focal point K of the micro lenses 47 is disposed at the opening portion surrounded by the light blocking film 42, $$\theta_3 \leq \theta_2 \tag{2}$$

When $\theta_3$ is reduced, light transmitting through the liquid crystal 34 is reduced, darkening an image. In order to avoid that, $\theta_3$ is preferably larger than $\theta_1$. Therefore, it is necessary to satisfy the following.

$$\theta_1 \leq \theta_3 \tag{3}$$

The following formula should be satisfied based on the formulas (2) and (3) for the design of the micro lenses 47.

$$\theta_1 \leq \theta_3 \leq \theta_2 \tag{4}$$

When the formula (1) is incorporated in the formula (4) and organized, the following formula (5) is obtained.

$$D/\tan\theta_2 \leq f \leq D/\tan\theta_1 \tag{5}$$

The micro lenses 47 should be designed so that the focal length f satisfies the formula (5).

Figure 19A:
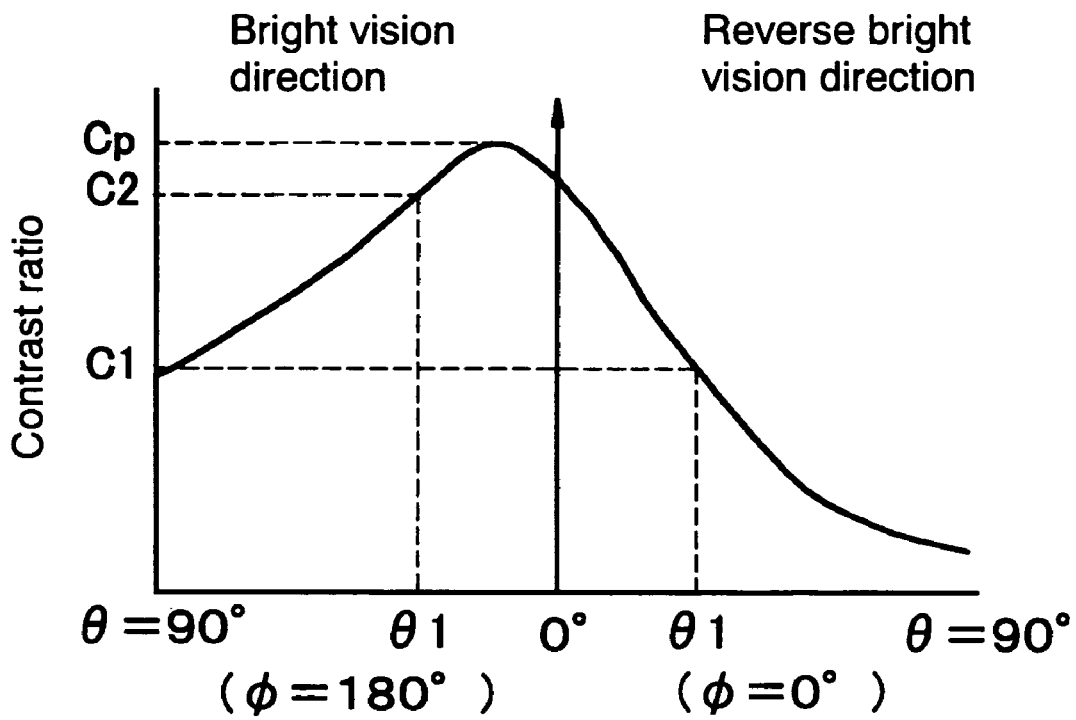
FIG. 19A shows an illustration of parameters $\theta 1$, C1, and C2 used for designing the micro lenses 47.
Figure 19B:
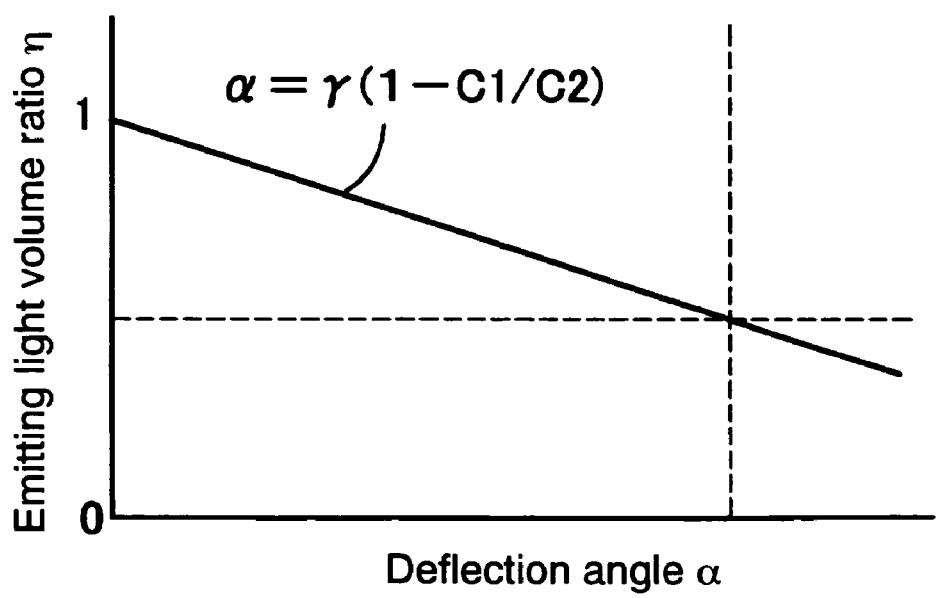
FIG. 19B shows an illustration of a relationship between an emitting light volume ratio $\eta$ and a deflection angle $\alpha$.
Figure 20:
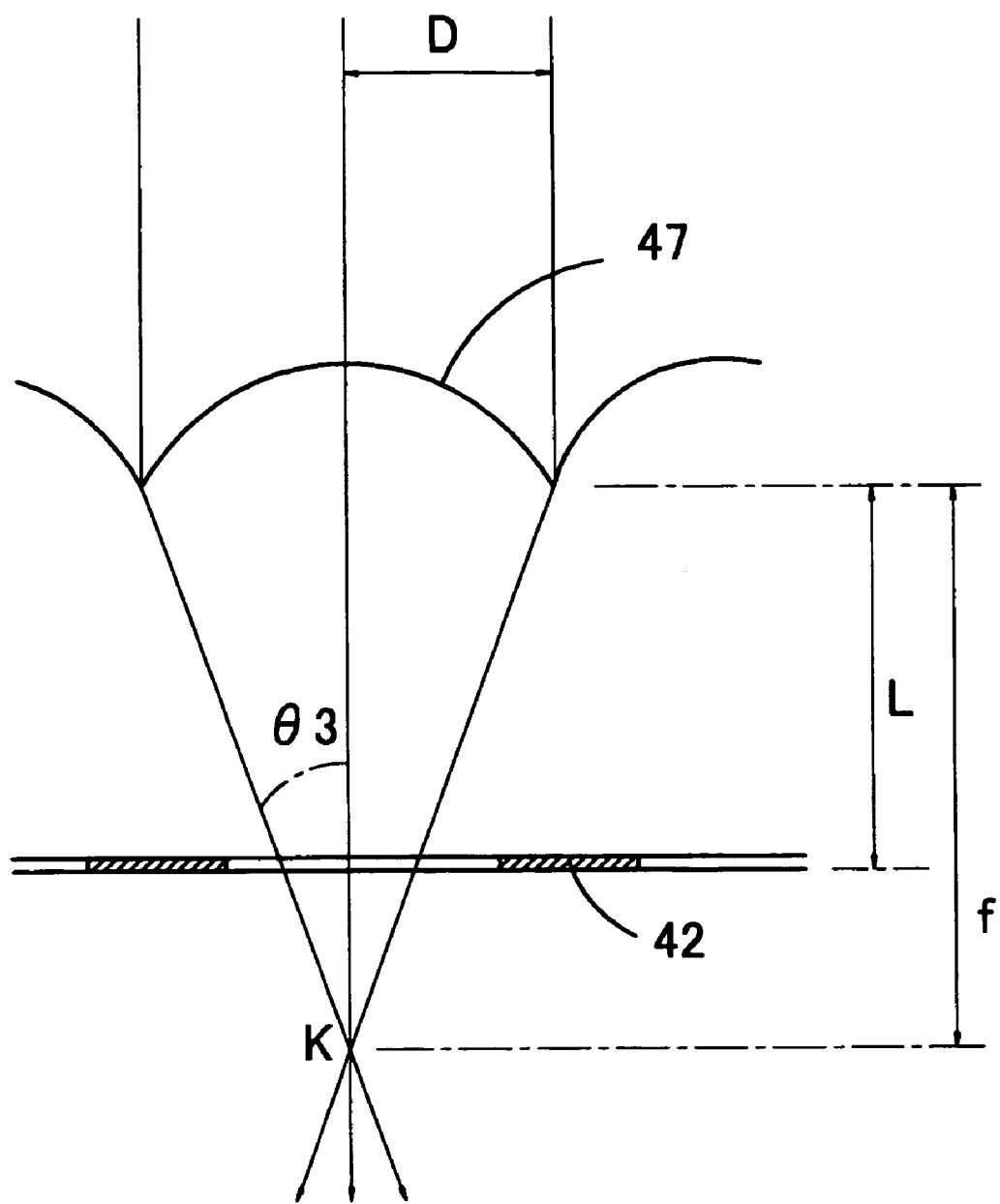
FIG. 20 shows an illustration of parameters used for designing the micro lenses 47.

$\theta_1$ can be obtained from a characteristic illustration such as FIG. 19A. Further, as shown in FIG. 20, when a distance from the micro lenses 47 to the liquid crystal 34 (or to light blocking film 42) is represented by L, and the half pixel size (half pitch) of the micro lenses 47 is represented by D, the divergence angle $\theta_2$ of the parallel ray when the focal point K of the micro lenses 47 is disposed at the opening portion surrounded by the light blocking film 42 is obtained by the following formula (6).

$$\tan\theta_2 = D/L \tag{6}$$

Next, a deflection angle $\alpha$ of the micro lenses 47 is determined by the contrast ratios $C_1$ and $C_2$ in the bright vision direction and the reverse bright vision direction and an emitting light volume ratio $\eta$ in the bright vision direction and the reverse bright vision direction (=light volume in reverse bright vision direction/light volume in bright vision direction). When the deflection angle of the micro lense 47 is represented by $\alpha$, the emitting light volume ratio $\eta$ is substantially empirically represented by the following formula.

$$\eta = 1 - 0.05\alpha \tag{7}$$

so that the emitting light volume ratio η substantially satisfies the following formula, $$\eta \geq C1/C2$$

when the tiling angle α is determined, the following is obtained.

$$\alpha \leq \gamma(1 - C1/C2) \quad (8)$$

The constant γ in the formula (8) is approximately 20. A range represented by the formula (8) is a region lower than a straight line shown in FIG. 19B. The liquid crystal device achieving a brightness and high contrast can be easily obtained as a result of designing the micro lenses 47 in such manner that the focal length f thereof satisfies the formula (5) and the deflection angle α thereof satisfies the formula (8).

Figure 21:
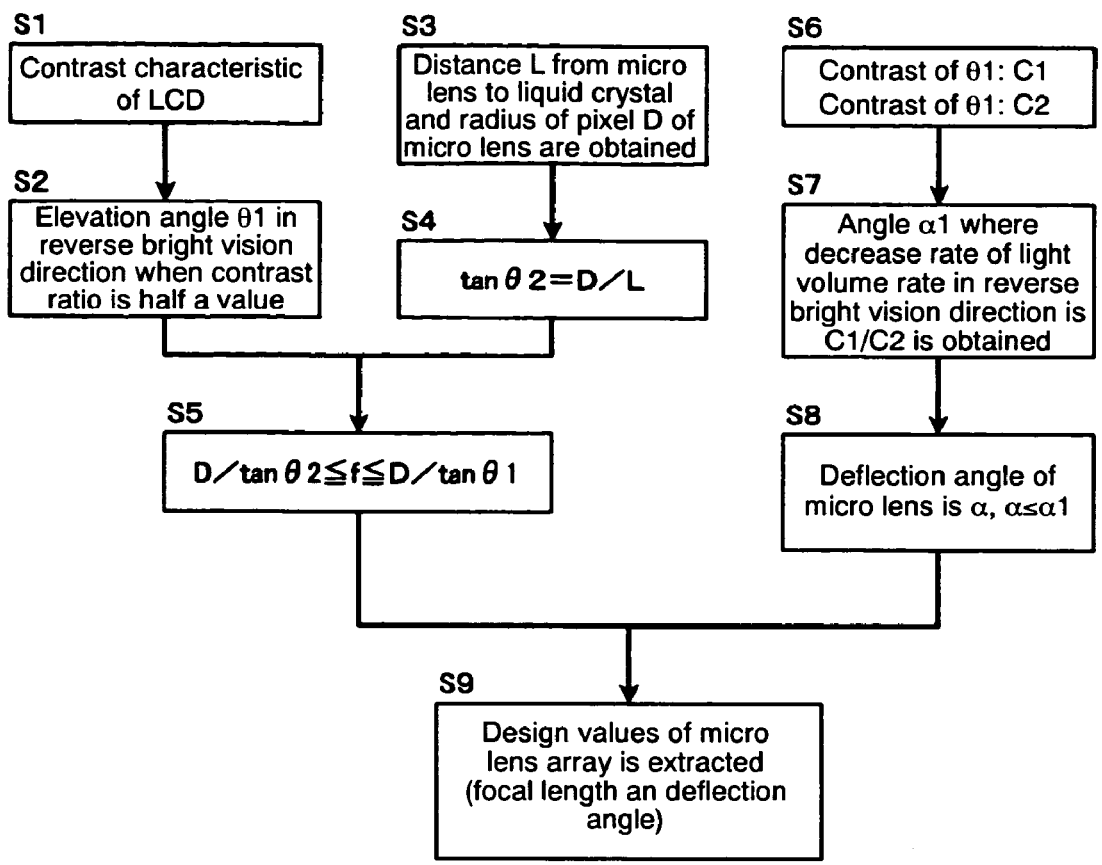
FIG. 21 shows a flow chart describing a designing process of the micro lens array 46.

FIG. 21 shows a flow chart describing a designing process. Describing the process according to the flow chart, first, a contrast characteristic of the liquid crystal device (LCD) 31 as shown in FIG. 19A is obtained (Step S1), the elevation angle θ1 when the contrast ratio is a value C1=Cp/2, which is half of the peak value Cp is then obtained from the contrast characteristic (Step S2). Next, the distance L from the micro lenses 47 to the liquid crystal 34 and a value of the half pixel size D of the micro lenses 47 is obtained from a design value of the liquid crystal device 31 (Step S3). A value of 2θ is obtained from the formula of tan θ2=D/L (Step S4). After that, the following condition relating to the focal length of the micro lenses 47 is obtained (Step S5).

$$D/\tan\theta2 \leq f \leq D/\tan\theta1$$

Meanwhile, the contrast characteristic obtained in the Step S1 is used to thereby obtain the contrast ratio C1 in the reverse bright vision direction and the contrast ratio C2 in the bright vision direction (Step S6). Then, the deflection angle a1 when a decrease rate of the light volume in the reverse bright vision direction is C1/C2 is obtained (Step S7). Thereafter, the following condition relating to the deflection angle α of the micro lenses 47 is obtained (Step S8).

$$\alpha \leq \alpha1$$

Finally, design values of the micro lenses 47 (values of focal length f and deflection angle α) are extracted (Step S9).

Figure 22A:
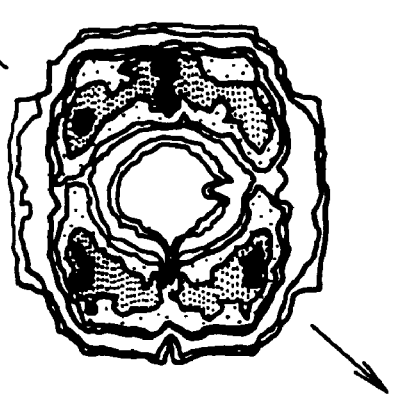
FIG. 22A shows a light volume distribution of light entering the liquid crystal 34 when the micro lenses 47 are not tilted.
Figure 22B:
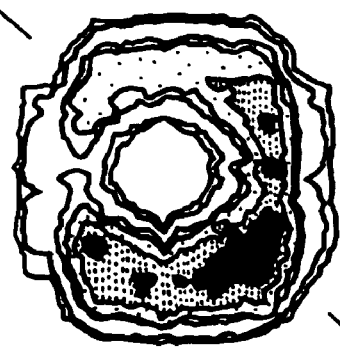
FIG. 22C shows a light volume distribution of light entering the liquid crystal 34 when the micro lenses 47 are tilted by the deflection angle $\alpha$=ten degrees.
Figure 22C:
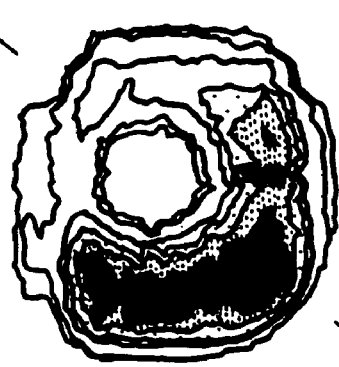

Next, data showing an effect of the present invention is described. FIGS. 22A, B and C show light volume distributions of light entering the liquid crystal 34. FIG. 22A shows the light volume distribution in the case where the micro lenses 47 are not tilted (α=zero degree). FIG. 22B shows the light volume distribution in the case where the micro lenses 47 are tilted by the deflection angle α=five degrees. FIG. 22C shows the light volume distribution in the case where the micro lenses 47 are tilted by the deflection angle α=ten degrees. As known from these drawings, when the micro lenses 47 are not tilted, the light volumes in the bright vision direction and the reverse bright vision direction are equal to each other. When the micro lenses 47 are tilted by the deflection angles α of five degrees and ten degrees, the light volume in the bright vision direction gradually increases with respect to the light volume in the reverse bright vision direction.

Figure 23:
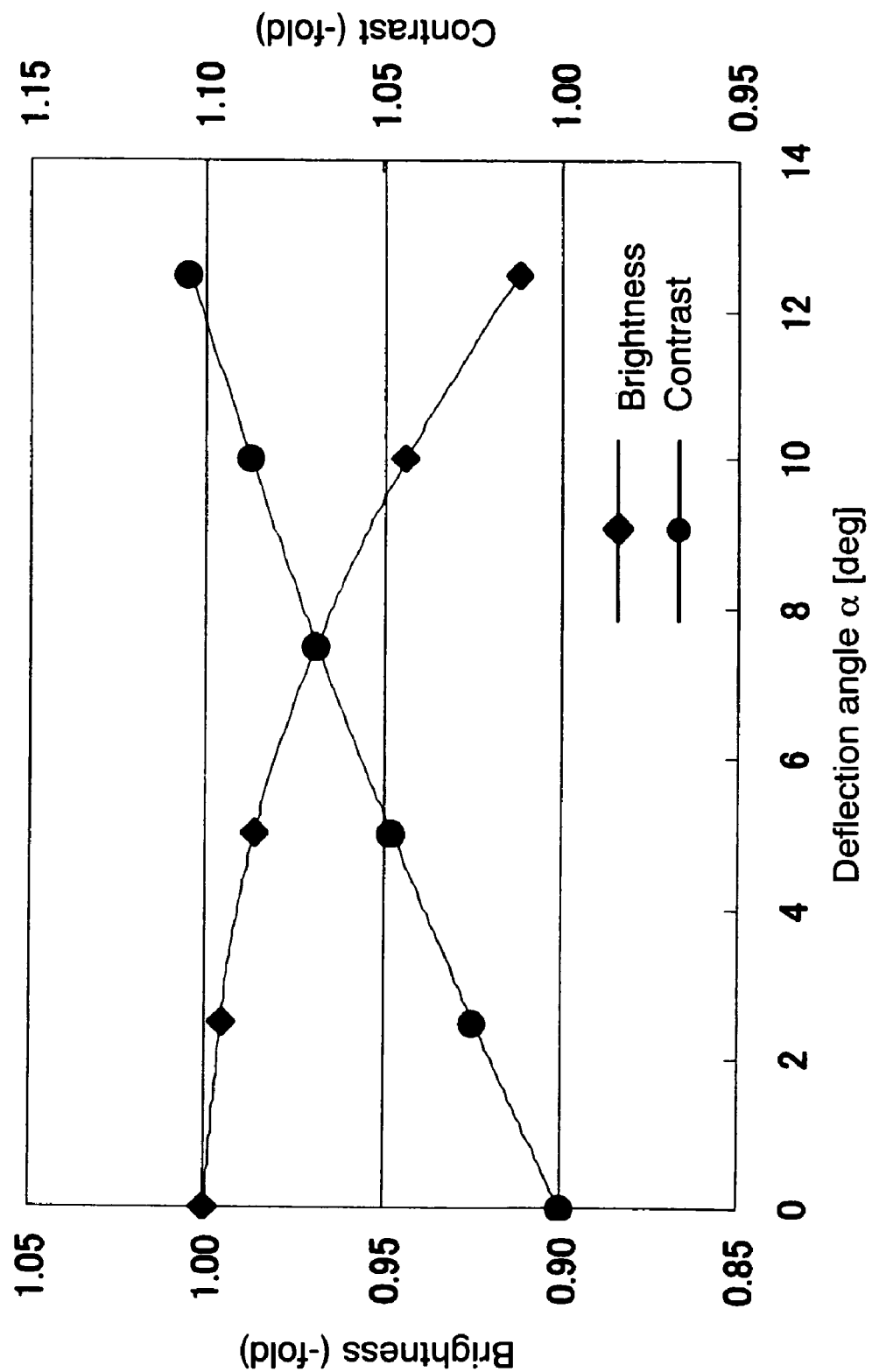
FIG. 23 shows a relationship between the deflection angle $\alpha$ of the micro lenses 47, and brightness (effective opening rate) and contrast of light transmitting through the liquid crystal device 31.

FIG. 23 shows a relationship between the tiling angle α of the micro lenses 47, and the brightness (or effective opening rate) and contrast concerning light transmitting through the liquid crystal device 31. As known from the drawing, when the micro lenses 47 are tilted, the brightness is more or less undermined, while the contrast ratio is largely improved. Therefore, a liquid crystal device 31 achieving a good brightness and contrast can be consequently manufactured.

Second Embodiment

Figure 24B:
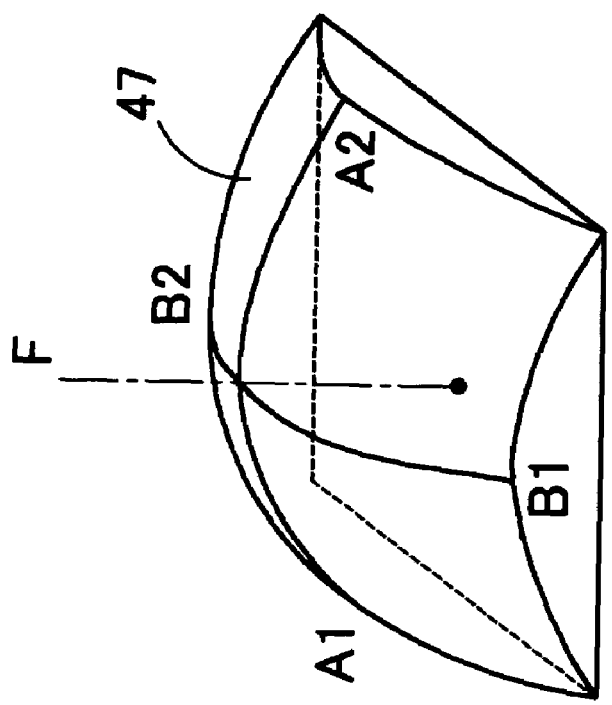
FIG. 24B shows a perspective view of a lens shape in a second micro lens array 46 according to the present invention.
Figure 24A:
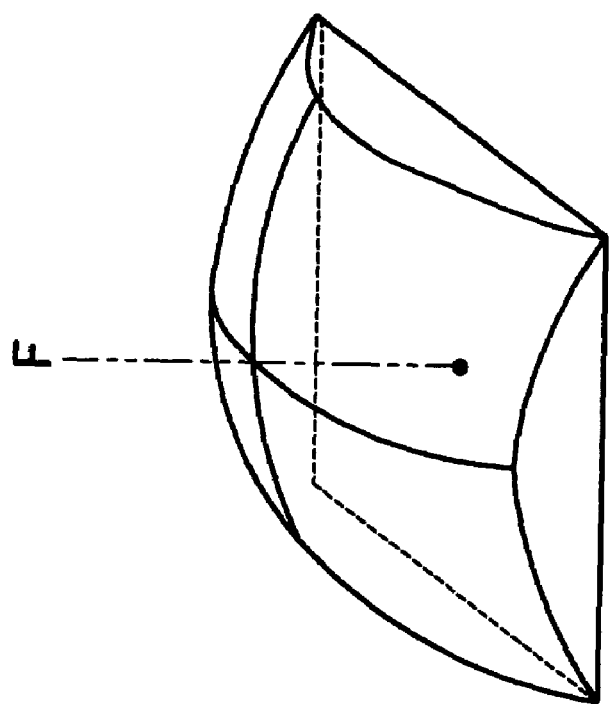
FIG. 24A shows a perspective view of a lens shape of a general micro lens array.

FIG. 24A shows an illustration of a lens shape in a general micro lens array. FIG. 24B shows an illustration of a lens shape in a second micro lens array 46 according to an embodiment of the present invention. The general micro lens shown in FIG. 24A comprises a lens surface of rotational symmetry around an optical center axis F vertical to pixel electrodes. On the other hand, the micro lens array 47 shown in FIG. 24B is designed in such manner that a focal length is longer in a cross-section surface including a direction connecting a bright vision direction and a reverse bright vision direction of liquid crystal and the optical axis of the lens (cross-section surface in bright vision direction—reverse bright vision direction) (cross-section surface in A1—A2 direction shown in FIG. 24B), and the focal length is shorter in a cross-section surface including a direction orthogonal to the direction connecting the bright vision direction and the reverse bright vision direction of the liquid crystal and the optical axis of the lens (cross-section surface in direction orthogonal to direction connecting bright vision direction—reverse bright vision direction) (cross-section surface in B1—B2 direction shown in FIG. 24B).

Figure 25B:
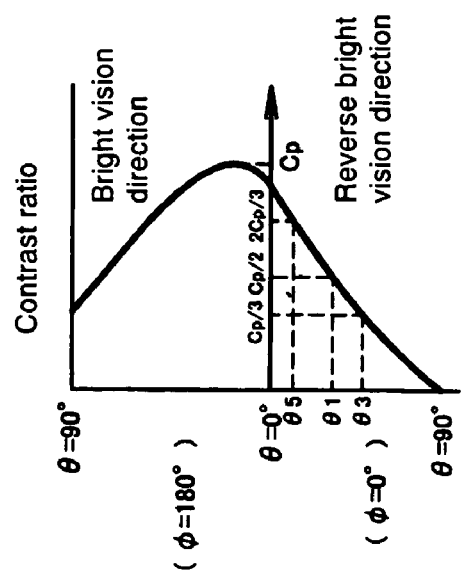
FIG. 25B shows a contrast ratio distribution in the bright vision direction—the reverse bright vision direction.
Figure 25A:
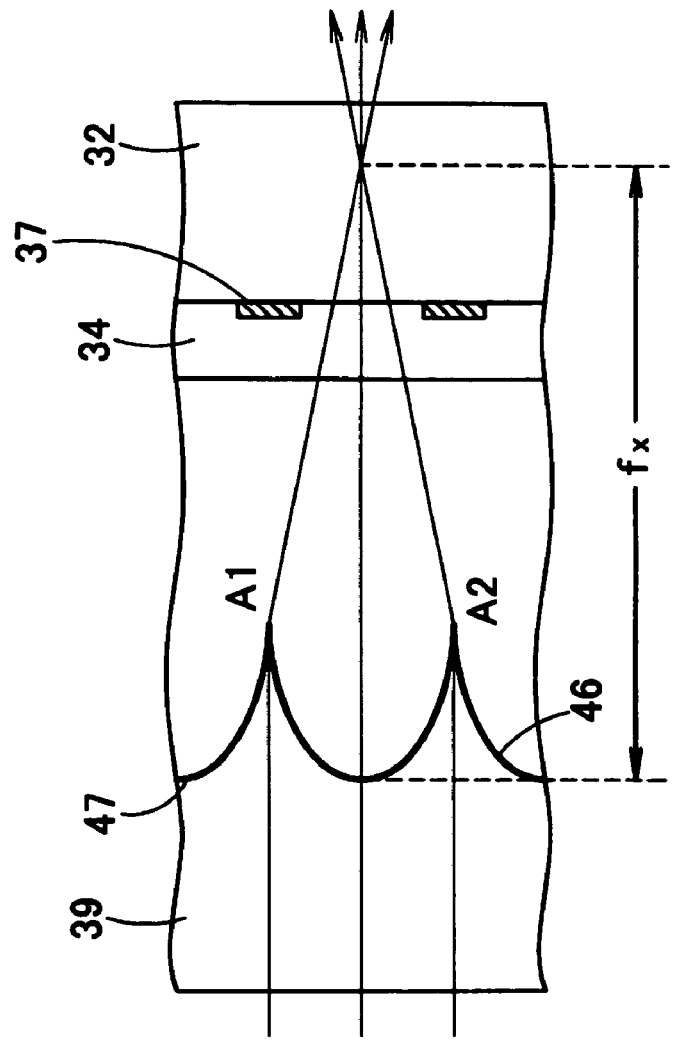
FIG. 25A shows a cross-sectional illustration of the liquid crystal device 31 using the second micro lens array 46 according to the present invention in a bright vision direction—a reverse bright vision direction.
Figure 26B:
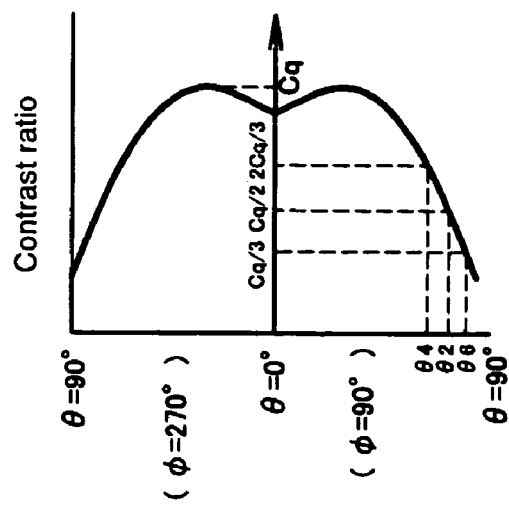
FIG. 26A shows a cross-sectional illustration of the liquid crystal device 31 using the second micro lens array 46 according to the present invention in a direction orthogonal to the bright vision direction—the reverse bright vision direction.
Figure 26A:
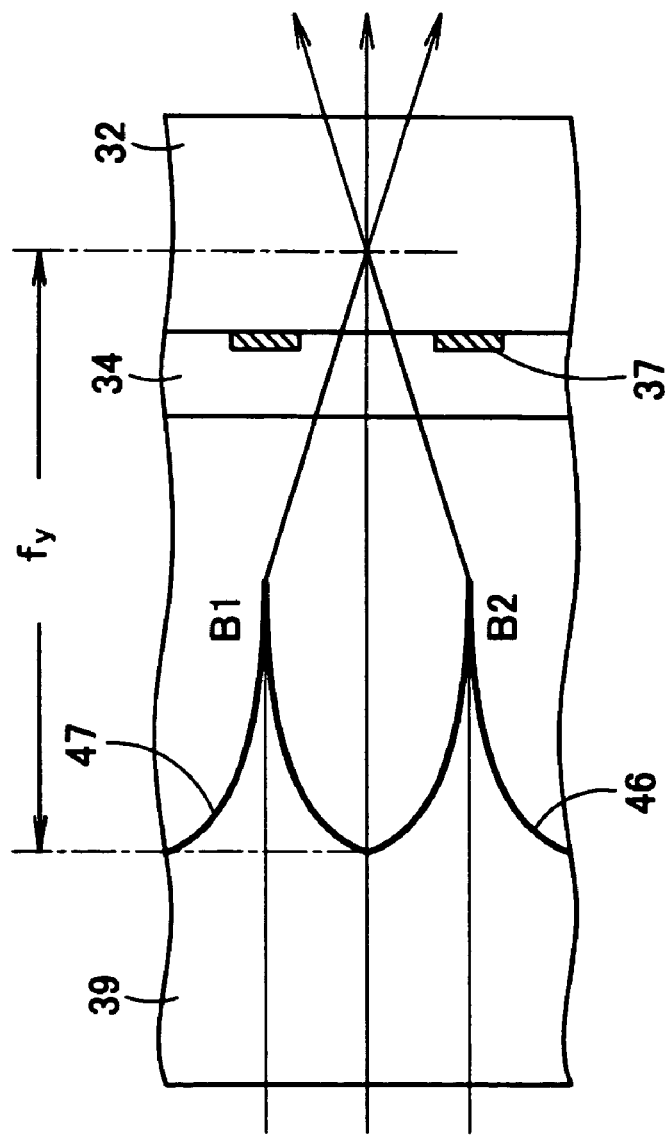
Figure 27:
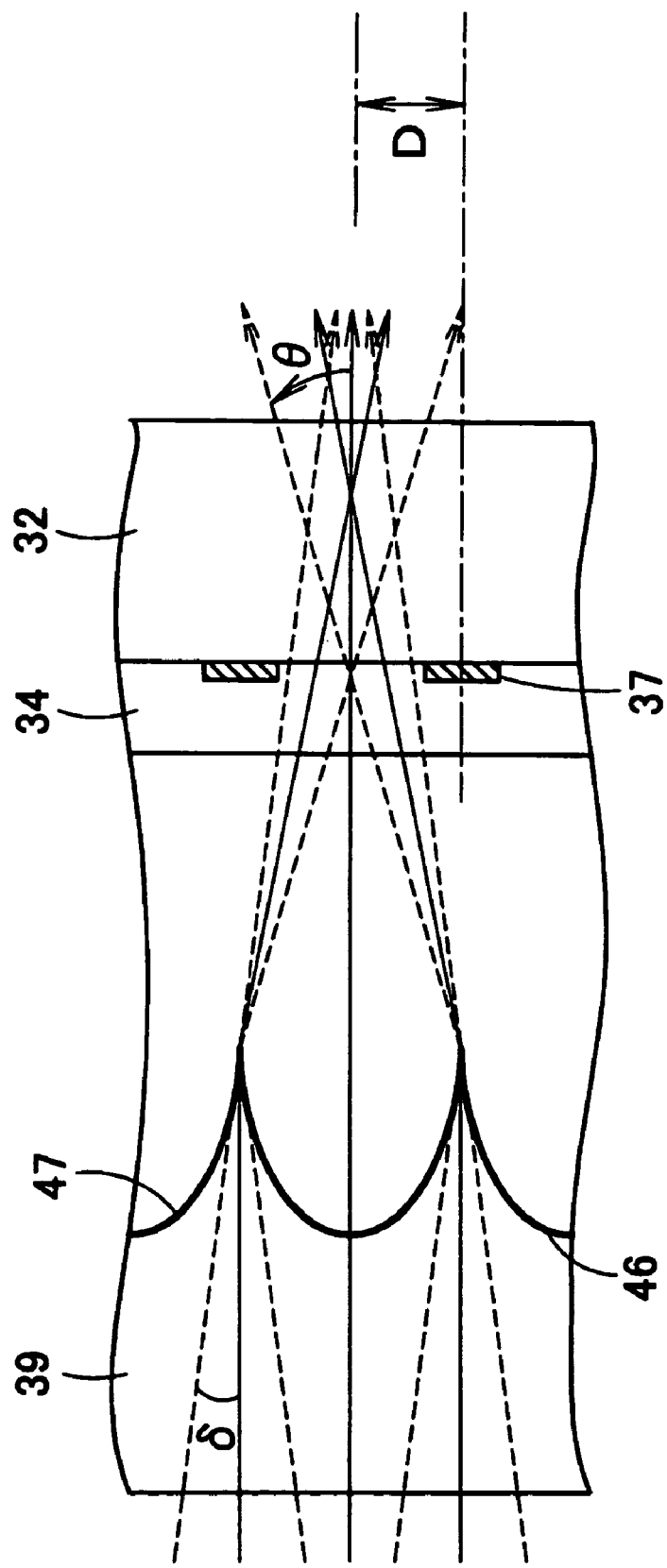
FIG. 27 shows an illustration of designing of focal lengths fx and fy in the second micro lens array 46 according to the present invention.

FIG. 25A and FIG. 26A both show a cross-section surface of a liquid crystal device comprising the micro lens array 46 shown in FIG. 24B. FIG. 25A shows the cross-section surface in the bright vision direction—the reverse bright vision direction (A1–A2 direction). FIG. 26A shows the cross-section surface in the direction orthogonal to the bright vision direction-the reverse bright vision direction (B1–B2 direction). FIG. 25B shows a contrast ratio distribution in the cross-section surface in the bright vision direction—the reverse bright vision direction (A1–A2 direction) of FIG. 25A. FIG. 26B shows the contrast ratio distribution in the direction orthogonal to the bright vision direction—the reverse bright vision direction (B1–B2 direction) of FIG. 26A. In FIGS. 25 through 27, a curved surface of the lens is exaggerated.

As shown in FIGS. 25A and B, the contrast ratio distribution of light emitted from the liquid crystal device in the cross-section surface in the bright vision direction and the reverse bright vision direction shows an asymmetrical characteristic, in which the contrast ratio is largely decreased in the reverse bright vision direction. Therefore, when a focal length fx of the micro lenses 47 is lengthened to thereby reduce an angle of the light emitting from the liquid crystal device, a volume of light emitting to a region, where the contrast ratio is low, can be reduced. Further, as shown in FIGS. 26A and B, the contrast ratio is symmetrically distributed in the cross-section surface orthogonal to the bright vision direction—the reverse bright vision direction. Therefore, when a focal length fy of the micro lenses 47 is reduced to thereby increase the angle of the light emitting from the liquid crystal device, light in a larger light volume can be emitted. More specifically, the micro lenses 47 are arranged to have a shape of a toric lens satisfying fx>fy and having the focal lengths different in accordance with the directions to thereby achieve a bright and high-contrast liquid crystal device.

Further, referring to FIG. 27, a method of setting the focal lengths fx and fy is described. When a pitch of the micro lenses array 46 is represented by 2D, a divergence angle of the light entering the micro lens array 46 is represented by 2d, an angle when the contrast ratio in the bright vision direction-the reverse bright vision direction is ½ of a maximum value Cp (value in reverse bright vision direction) is represented by θ1, and an angle when the contrast ratio in the direction orthogonal to the bright vision direction—the reverse bright vision direction is ½ of a maximum value Cq is represented by θ2, providing that the focal lengths fx and fy of the micro lenses 47 satisfy the following formulas, $fx \leq D/\tan(\theta 1-d)$ $fy \leq D/\tan(\theta 2-d)$ a liquid crystal device having more brightness and contrast ratio can be obtained.

When the pitch of the micro lens array 46 is represented by 2D, the divergence angle of the light entering the micro lens array 46 is represented by 2d, the angle when the contrast ratio in the bright vision direction—the reverse bright vision direction is ½ of the maximum value Cp is, the angle when the contrast ratio in the direction orthogonal to the bright vision direction—the reverse bright vision direction is ½ of the maximum value Cq is represented by θ1 is represented by θ2, an angle when the contrast ratio in the bright vision direction-the reverse bright vision direction (value in reverse bright vision direction) is ⅓ of the maximum value Cp is represented by θ3, and an angle when the contrast ratio in the direction orthogonal to the bright vision direction—the reverse bright vision direction is ⅓ of the maximum value Cq is represented by θ4, providing that the focal lengths fx and fy of the micro lenses 47 satisfy the following formulas, $D/\tan(\theta 1-d) \leq fx \leq D/\tan(\theta 3-d)$ $D/\tan(\theta 2-d) \leq fy \leq D/\tan(\theta 4-d)$ a liquid crystal device having more brightness can be obtained.

When the pitch of the micro lens array 46 is represented by 2D, the divergence angle of the light entering the micro lens array 46 is represented by 2d, the angle when the contrast ratio in the bright vision direction—the reverse bright vision direction is ⅓ of the maximum value Cp is represented by θ3, the angle when the contrast ratio in the direction orthogonal to the bright vision direction—the reverse bright vision direction is ⅓ of the maximum value Cq is represented by θ4, an angle when the contrast ratio in the bright vision direction—the reverse bright vision direction is ⅔ of the maximum value Cp is represented by θ5, and an angle when the contrast ratio in the direction orthogonal to the bright vision direction—the reverse bright vision direction is ⅔ of the maximum value Cq is represented by θ6, providing that the focal lengths fx and fy of the micro lenses 47 satisfy the following formulas, $D/\tan(\theta 5-d) \leq fx \leq D/\tan(\theta 3-d)$ $D/\tan(\theta 6-d) \leq fy \leq D/\tan(\theta 4-d)$ a liquid crystal device having more contrast ratio can be obtained.

FIG. 28 shows a comparison in terms of the brightness (effective opening ratio) and contrast ratio in the liquid crystal device, referring to different case where the micro lenses are not employed, the conventional micro lenses are employed, and the micro lens array according to the present invention are employed. When the micro lenses are not used, the poorest brightness, while the best contrast ratio, and when the conventional micro lenses are used, the highest brightness, while the lowest contrast ratio. Thus, the examples relating to the conventional micro lenses are not always desirable for the liquid crystal device because of their extreme characteristics. When the micro lenses according to the present invention are used, the brightness and contrast ratio both achieves an intermediate level. Thus, a liquid crystal device having relatively high brightness and favorable contrast ratio, which is suitable for practical use, can be manufactured.

Figure 29A:
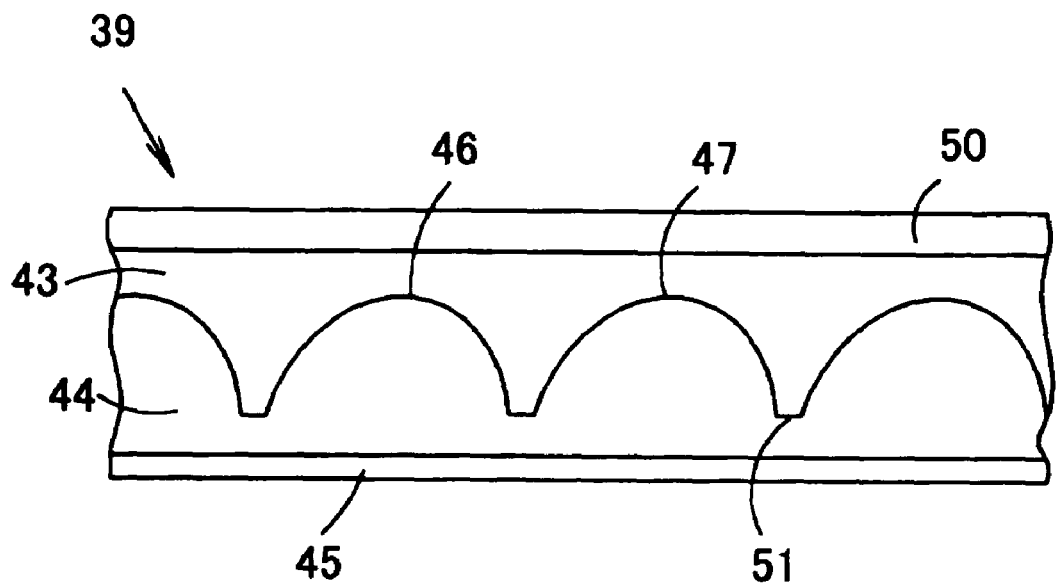
FIGS. 29A and B respectively show another configurations in cross section of a lens array substrate 39 used in the liquid crystal device 31 according to the present invention.
Figure 29B:
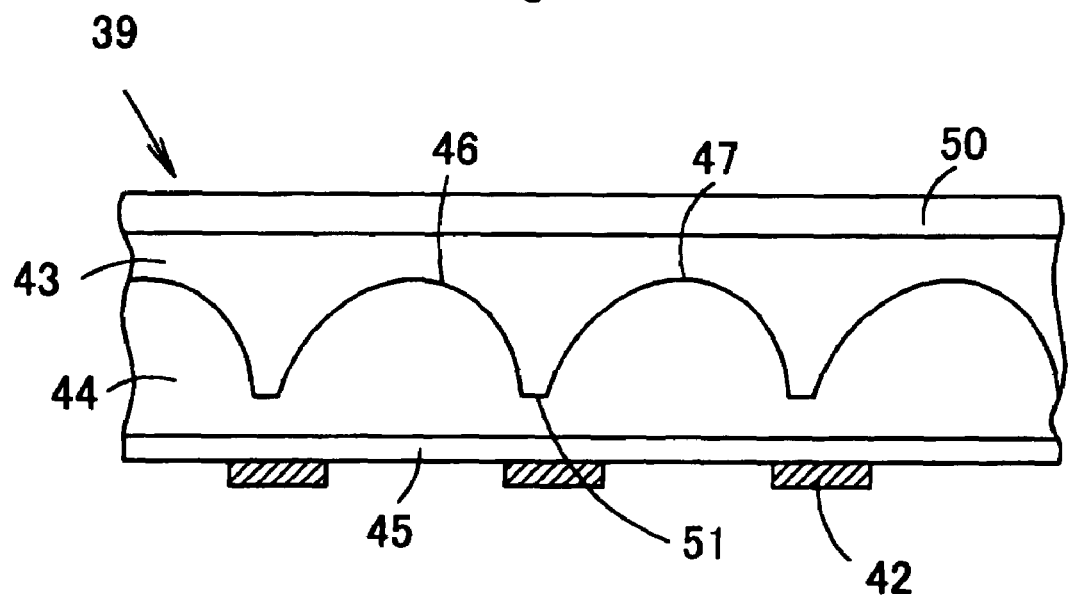
Figure 30B:
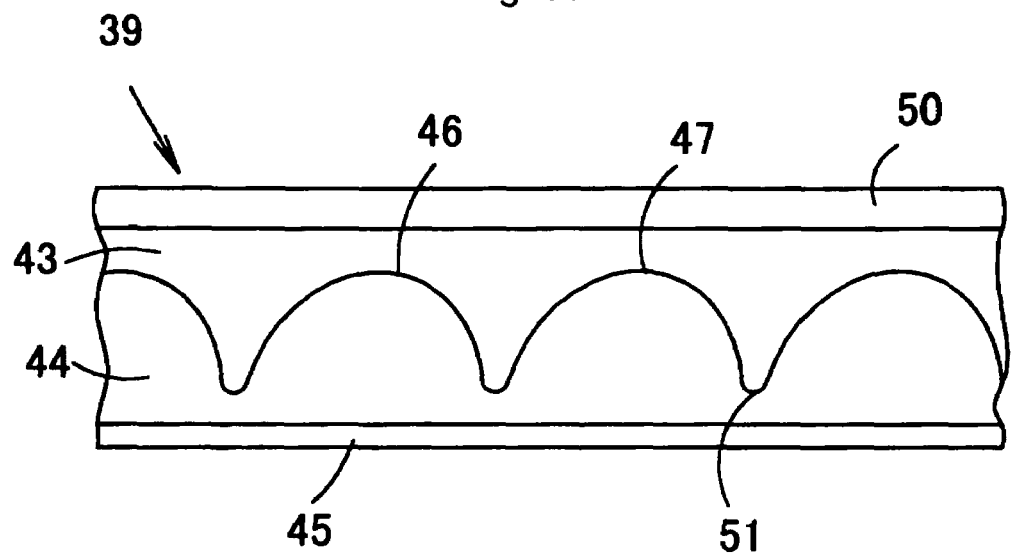
FIGS. 30A and B respectively show still another configurations in cross section of the lens array substrate 39 used in the liquid crystal device 31 according to the present invention.
Figure 30B:
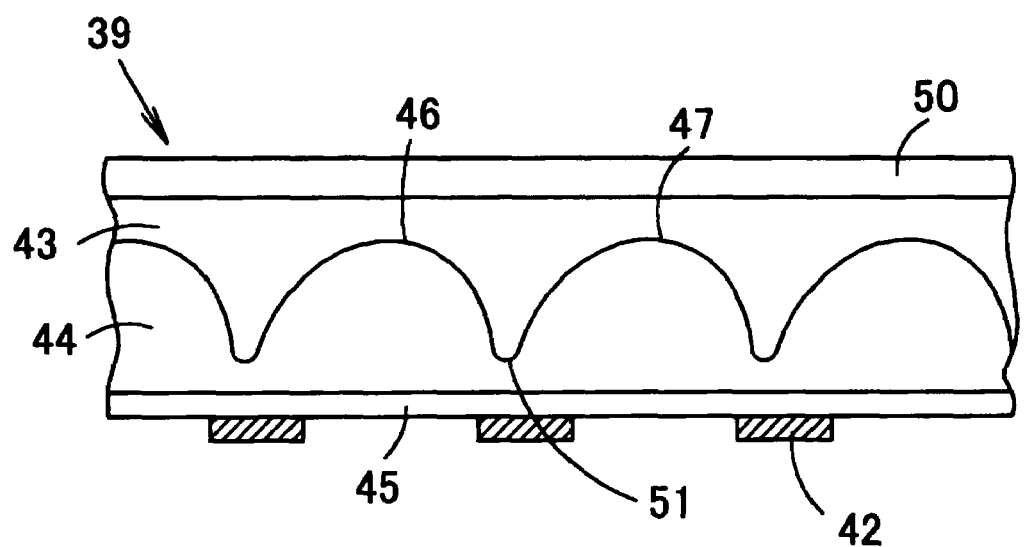

FIG. 29A shows a cross-section view of another structure of the lens array substrate 39 used for the liquid crystal device according to the present invention. In the micro lens array 46 shown in FIG. 12, a boundary portion between the micro lenses 47 has a sharp shape. Therefore, such problems as breakage of an edge of the lenses and a defective formation of the lenses are possibly generated. Therefore, in the present embodiment, a lens layer 43 is formed on a surface of a glass substrate 50, and further, a boundary portion 51 between the micro lenses 47 is formed in a flat shape. As a possible formation, a light blocking film 42 may be previously provided on an inner surface of the lens array substrate 39, as shown in FIG. 29B. The shape of the border portion 51 is not limited to the flat shape, and may be formed in a curved portion, as shown in FIGS. 30A and B.

Figure 31:
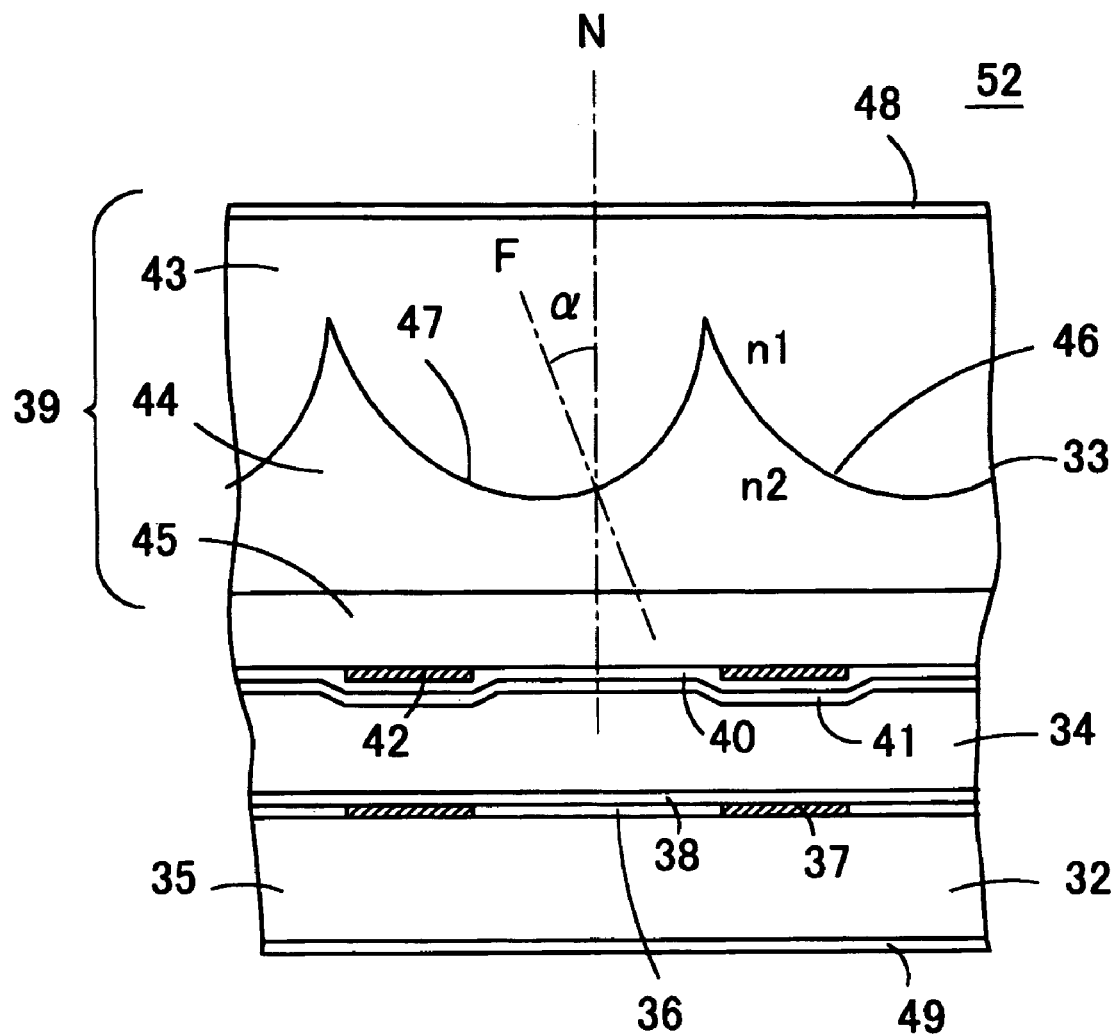
FIG. 31 shows a liquid crystal device 31 in cross section according to another embodiment of the present invention.

FIG. 31 shows another embodiment of the liquid crystal device according to the present invention in a cross-section view. Any component in a liquid crystal device 52 shown therein, which is configured in the same manner as in the liquid crystal device 31 of FIG. 12 is provided with the same reference symbol, and those components are not described here. The liquid crystal device 52 also comprises the micro lens array 46 formed in an interface between the lens layer 43 and an adhesive layer 44 having different refractivities (NOTE: shape of micro lenses 47 is exaggerated in FIG. 31). The micro lenses 47 constituting the micro lens array 46 have a shape of rotational symmetry centered on the optical center axis F thereof, for example, a shape of a rotational aspheric surface lens. The micro lenses 47 are protruded toward the adhesive-layer-44 side in a convex shape. A refractivity n2 of the adhesive layer 44 is smaller than a refractivity n1 of the lens layer 43 (n1>n2), and the micro lenses 47 have an action of a convex lens. In that case, the optical center axis F of the micro lenses 47 is tilted by the angle of α in the reverse bright vision direction. The present embodiment can exert the same effect as in the embodiment of FIG. 12, and the like.

Figure 32:
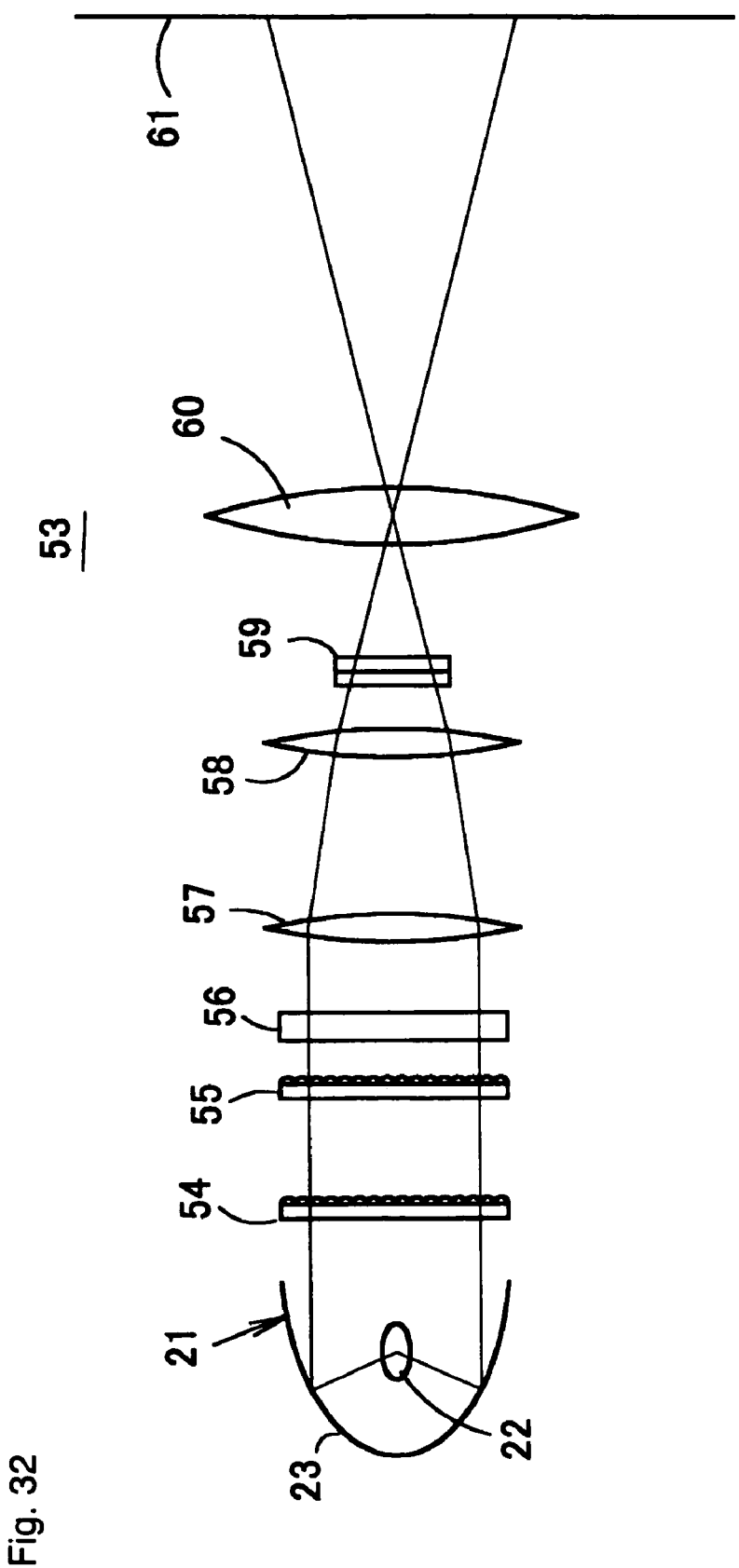
FIG. 32 shows a schematic illustration of a projection type image display apparatus using the liquid crystal device 31 according to the present invention.

FIG. 32 shows a schematic illustration of an image display apparatus 53 of a projection type using a liquid crystal device 59 according to the present inventiont. The image display apparatus 53 is designed to emit a substantially parallel light from a light source 21 comprised of a lamp 22, such as a xenon lamp, and a reflecting mirror 23 having a shape of a rotational parabolic surface. Light emitted from the light source 21 is converged by means of a convergence optical system comprised of micro lens arrays 54 and 55 and convergence lenses 57 and 58 to be thereby irradiated to the liquid crystal device 59, while a polarization direction of the light is organized by means of a polarized-light conversion system 56 prior to the irradiation. An image generated by light transmitting through the liquid crystal device 59 is projected on a screen 61 by means of a projection lens 60.

A liquid crystal device achieving a good image quality capable of displaying a bright image having a high contrast can be obtained by using the lens array according to the present invention.

What is claimed is:

1. A lens array comprising:

a plurality of lenses and used for a liquid crystal display device, wherein the lenses are formed in such manner that a focal length fx in a cross-section surface including a direction connecting a bright vision direction and a reverse bright vision direction of liquid crystal and an optical axis of the lenses is longer than a focal length fy in a cross-section surface including a direction orthogonal to the direction connecting the bright vision direction and the reverse bright vision direction of the liquid crystal and the optical axis of the lenses, wherein, when a pitch of the lenses is represented by 2D, a divergence angle of an incident light with respect to the lenses is represented by 2δ, an angle, at which a contrast ratio on the reverse bright vision side in the cross-section surface including the direction connecting the bright vision direction and the reverse bright vision direction of the liquid crystal and the optical axis of the lenses is ½ of a maximum value, is represented by θ1, and an angle, at which the contrast ratio in the cross-section surface including the direction orthogonal to the direction connecting the bright vision direction and the reverse bright vision direction of the liquid crystal and the optical axis of the lenses is ½ of a maximum value, is represented by θ2, the focal length of the lenses fx in the cross-section surface including the direction connecting the bright vision direction and the reverse bright vision direction of the liquid crystal and the optical axis of the lenses and the focal length of the lenses fy in the cross-section surface including the direction orthogonal to the direction connecting the bright vision direction and the reverse bright vision direction of the liquid crystal and the optical axis of the lenses satisfy the following formulas:

$fx \leq D/\tan(\theta 1-\delta)$ $fy \leq D/\tan(\theta 2-\delta)$.

2. A lens array comprising:

a plurality of lenses and used for a liquid crystal display device, wherein the lenses are formed in such manner that a focal length fx in a cross-section surface including a direction connecting a bright vision direction and a reverse bright vision direction of liquid crystal and an optical axis of the lenses is longer than a focal length fy in a cross-section surface including a direction orthogonal to the direction connecting the bright vision direction and the reverse bright vision direction of the liquid crystal and the optical axis of the lenses, wherein, when a pitch of the lenses is represented by 2D, a divergence angle of an incident light with respect to the lenses is represented by 2δ, angles, where contrast ratios on the reverse bright vision side in the cross-section surface including the direction connecting the bright vision direction and the reverse bright vision direction of the liquid crystal and the optical axis of the lenses are ½ and ⅓ of a maximum value, are respectively represented by θ1 and θ3, and angles, at which the contrast ratios in the cross-section surface including the direction orthogonal to the direction connecting the bright vision direction and the reverse bright vision direction of the liquid crystal and the optical axis of the lenses are ½ and ⅓ of a maximum value, are respectively represented by θ2 and θ4, the focal length of the lenses fx in the cross-section surface including the direction connecting the bright vision direction and the reverse bright vision direction of the liquid crystal and the optical axis of the lenses and the focal length of the lenses fy in the cross-section surface including the direction orthogonal to the direction connecting the bright vision direction and the reverse bright vision direction of the liquid crystal and the optical axis of the lenses satisfy the following formulas:

$D/\tan(\theta 1-\delta) \leq fx \leq D/\tan(\theta 3-\delta)$ $D/\tan(\theta 2-\delta) \leq fy \leq D/\tan(\theta 4-\delta)$.

3. A lens array a claimed in claim 1, comprising:

a plurality of lenses and used for a liquid crystal display device, wherein the lenses are formed in such manner that a focal length fx in a cross-section surface including a direction connecting a bright vision direction and a reverse bright vision direction of liquid crystal and an optical axis of the lenses is longer than a focal length fy in a cross-section surface including a direction orthogonal to the direction connecting the bright vision direction and the reverse bright vision direction of the liquid crystal and the optical axis of the lenses, wherein, when a pitch of the lenses is represented by 2D, a divergence angle of an incident light with respect to the lenses is represented by 2δ, angles, at which contrast ratios on the reverse bright vision side in the cross-section surface including the direction connecting the bright vision direction and the reverse bright vision direction of the liquid crystal and the optical axis of the lenses are ⅓ and ⅔ of a maximum value, are respectively represented by θ3 and θ5, and angles, at which the contrast ratios in the cross-section surface including the direction orthogonal to the direction connecting the bright vision direction and the reverse bright vision direction of the liquid crystal and the optical axis of the lenses are ⅓ and ⅔ of a maximum value, are respectively represented by θ4 and θ6, the focal length of the lenses fx in the cross-section surface including the direction connecting the bright vision direction and the reverse bright vision direction of the liquid crystal and the optical axis of the lenses and the focal length of the lenses fy in the cross-section surface including the direction orthogonal to the direction connecting the bright vision direction and the reverse bright vision direction of the liquid crystal and the optical axis of the lenses satisfy the following formulas:

$D/\tan(\theta 5-\delta) \leq fx \leq D/\tan(\theta 3-\delta)$ $D/\tan(\theta 6-\delta) \leq fy \leq D/\tan(\theta 4-\delta)$, direction connecting the bright vision direction and the reverse bright vision direction of the liquid crystal and the optical axis of the lenses.

4. An image display apparatus of a projection type comprising a lens array comprising:

a plurality of lenses and used for a liquid crystal display device, wherein the lenses are formed in such manner that a focal length fx in a cross-section surface including a direction connecting a bright vision direction and a reverse bright vision direction of liquid crystal and an optical axis of the lenses is longer than a focal length fy in a cross-section surface including a direction orthogonal to the direction connecting the bright vision direction and the reverse bright vision direction of the liquid crystal and the optical axis of the lenses, wherein, when a pitch of the lenses is represented by 2D, a divergence angle of an incident light with respect to the lenses is represented by 2δ, an angle, at which a contrast ratio on the reverse bright vision side in the cross-section surface including the direction connecting the bright vision direction and the reverse bright vision direction of the liquid crystal and the optical axis of the lenses is ½ of a maximum value, is represented by θ1, and an angle, at which the contrast ratio in the cross-section surface including the direction orthogonal to the direction connecting the bright vision direction and the reverse bright vision direction of the liquid crystal and the optical axis of the lenses is ½ of a maximum value, is represented by θ2, the focal length of the lenses fx in the cross-section surface including the direction connecting the bright vision direction and the reverse bright vision direction of the liquid crystal and the optical axis of the lenses and the focal length of the lenses fy in the cross-section surface including the direction orthogonal to the direction connecting the bright vision direction and the reverse bright vision direction of the liquid crystal and the optical axis of the lenses satisfy the following formulas:

$fx \leq D/\tan(\theta_1 - \delta)$ $fy \leq D/\tan(\theta_2 - \delta)$.

5. An image display apparatus of a projection type comprising a lens array comprising:

a plurality of lenses and used for a liquid crystal display device, wherein the lenses are formed in such manner that a focal length fx in a cross-section surface including a direction connecting a bright vision direction and a reverse bright vision direction of liquid crystal and an optical axis of the lenses is longer than a focal length fy in a cross-section surface including a direction orthogonal to the direction connecting the bright vision direction and the reverse bright vision direction of the liquid crystal and the optical axis of the lenses, wherein, when a pitch of the lenses is represented by 2D, a divergence angle of an incident light with respect to the lenses is represented by 2δ, angles, where contrast ratios on the reverse bright vision side in the cross-section surface including the direction connecting the bright vision direction and the reverse bright vision direction of the liquid crystal and the optical axis of the lenses are ½ and ⅓ of a maximum value, are respectively represented by θ1 and θ3, and angles, at which the contrast ratios in the cross-section surface including the direction orthogonal to the direction connecting the bright vision direction and the reverse bright vision direction of the liquid crystal and the optical axis of the lenses are ½ and ⅓ of a maximum value, are respectively represented by θ2 and θ4, the focal length of the lenses fx in the cross-section surface including the direction connecting the bright vision direction and the reverse bright vision direction of the liquid crystal and the optical axis of the lenses and the focal length of the lenses fy in the cross-section surface including the direction orthogonal to the direction connecting the bright vision direction and the reverse bright vision direction of the liquid crystal and the optical axis of the lenses satisfy the following formulas:

$D/\tan(\theta_1 - \delta) \leq fx \leq D/\tan(\theta_3 - \delta)$ $D/\tan(\theta_2 - \delta) \leq fy \leq D/\tan(\theta_4 - \delta)$.

6. An image display apparatus of a projection type comprising a lens array comprising:

a plurality of lenses and used for a liquid crystal display device, wherein the lenses are formed in such manner that a focal length fx in a cross-section surface including a direction connecting a bright vision direction and a reverse bright vision direction of liquid crystal and an optical axis of the lenses is longer than a focal length fy in a cross-section surface including a direction orthogonal to the direction connecting the bright vision direction and the reverse bright vision direction of the liquid crystal and the optical axis of the lenses, wherein, when a pitch of the lenses is represented by 2D, a divergence angle of an incident light with respect to the lenses is represented by 2δ, angles, at which contrast ratios on the reverse bright vision side in the cross-section surface including the direction connecting the bright vision direction and the reverse bright vision direction of the liquid crystal and the optical axis of the lenses are ⅓ and ⅔ of a maximum value, are respectively represented by θ3 and θ5, and angles, at which the contrast ratios in the cross-section surface including the direction orthogonal to the direction connecting the bright vision direction and the reverse bright vision direction of the liquid crystal and the optical axis of the lenses are ⅓ and ⅔ of a maximum value, are respectively represented by θ4 and θ6, the focal length of the lenses fx in the cross-section surface including the direction connecting the bright vision direction and the reverse bright vision direction of the liquid crystal and the optical axis of the lenses and the focal length of the lenses fy in the cross-section surface including the direction orthogonal to the direction connecting the bright vision direction and the reverse bright vision direction of the liquid crystal and the optical axis of the lenses satisfy the following formulas:

$D/\tan(\theta_5 - \delta) \leq fx \leq D/\tan(\theta_3 - \delta)$ $D/\tan(\theta_6 - \delta) \leq fy \leq D/\tan(\theta_4 - \delta)$.

* * * * *